US012713090B2

(12) United States Patent
Garner et al.

(10) Patent No.: US 12,713,090 B2
(45) Date of Patent: Aug. 18, 2026

(54) CONTENT ITEM POSITIONING

(71) Applicant: Roku, Inc., San Jose, CA (US)

(72) Inventors: Gregory Garner, Key Colony Beach, FL (US); Sunil Ramesh, Saratoga, CA (US); David Lee Stern, Los Gatos, CA (US); Michael Patrick Cutter, Golden, CO (US); Robert Caston Curtis, Napa, CA (US); Patrick Brouillette, Tempe, AZ (US); Karina Levitian, Austin, TX (US); Philip Golyshko, Westminster, CO (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/780,008

(22) Filed: Jul. 22, 2024

(65) Prior Publication Data

US 2026/0025548 A1 Jan. 22, 2026

(51) Int. Cl.

| | |
|---|---|
| ***H04N 21/43*** | (2011.01) |
| ***G06F 3/14*** | (2006.01) |
| ***H04N 21/431*** | (2011.01) |
| ***H04N 21/442*** | (2011.01) |

(52) U.S. Cl.

CPC ....... *H04N 21/4316* (2013.01); *G06F 3/1423* (2013.01); *H04N 21/44218* (2013.01)

(58) Field of Classification Search

None

See application file for complete search history.

(56) References Cited

U.S. PATENT DOCUMENTS

| | | | |
|---|---|---|---|
| 5,498,003 | A | 3/1996 | Gechter |
| 5,715,416 | A | 2/1998 | Baker |
| 5,838,314 | A | 11/1998 | Neel et al. |
| 5,872,575 | A | 2/1999 | Segal |
| 6,057,872 | A | 5/2000 | Candelore |
| 6,097,393 | A | 8/2000 | Prouty et al. |
| 6,409,602 | B1 | 6/2002 | Wiltshire et al. |
| 6,766,524 | B1 | 7/2004 | Matheny et al. |
| 7,000,242 | B1 | 2/2006 | Haber |
| 7,054,831 | B2 | 5/2006 | Koenig |
| 7,071,041 | B2 | 7/2006 | Yamazaki et al. |

(Continued)

OTHER PUBLICATIONS

International Search Report and Written Opinion, dated Nov. 18, 2025, for the corresponding International Application No. PCT/US2025/038359, 6 pages.

*Primary Examiner* — Samira Monshi

(74) *Attorney, Agent, or Firm* — Straylight LLP

(57) ABSTRACT

Systems, methods, and computer-readable media are provided for content item positioning. In some examples, a method can include obtaining a first content item for display at a first display device, the first content item comprising video data; based on the video data, generating a saliency map of the first content item, the saliency map identifying regions of the first content item, each region being associated with a saliency value; determining, based on the saliency map, whether one or more regions of the regions have a saliency value that is below a predetermined saliency value; and based on the determining whether the one or more regions have a saliency value that is below a predetermined saliency value, determining whether to insert a second content item within the one or more regions of the first content item or within a display region of a second display device.

20 Claims, 16 Drawing Sheets

(56) References Cited

U.S. PATENT DOCUMENTS

| | | | |
|---|---|---|---|
| 7,162,197 | B2 | 1/2007 | Kitamura |
| 7,375,731 | B2 | 5/2008 | Divakaran et al. |
| 7,715,642 | B1 | 5/2010 | Collins et al. |
| 8,043,156 | B2 | 10/2011 | Ackley et al. |
| 8,090,799 | B2 | 1/2012 | Keeler |
| 8,221,220 | B2 | 7/2012 | Ackley et al. |
| 8,271,575 | B2 | 9/2012 | Hunter |
| 8,424,034 | B2 | 4/2013 | Bokor |
| 8,429,015 | B2 | 4/2013 | Do |
| 8,713,603 | B2 | 4/2014 | Kilar et al. |
| 10,524,006 | B2 | 12/2019 | Benea et al. |
| 2001/0001160 | A1 | 5/2001 | Shoff et al. |
| 2001/0037303 | A1 | 11/2001 | Mizrahi |
| 2001/0039571 | A1 | 11/2001 | Atkinson |
| 2002/0033844 | A1 | 3/2002 | Levy et al. |
| 2002/0052746 | A1 | 5/2002 | Handelman |
| 2002/0069405 | A1 | 6/2002 | Chapin et al. |
| 2002/0184098 | A1 | 12/2002 | Giraud et al. |
| 2002/0186867 | A1 | 12/2002 | Gutta et al. |
| 2003/0056212 | A1 | 3/2003 | Siegel et al. |
| 2003/0149618 | A1 | 8/2003 | Sender et al. |
| 2003/0149975 | A1 | 8/2003 | Eldering et al. |
| 2003/0192060 | A1 | 10/2003 | Levy |
| 2003/0217210 | A1 | 11/2003 | Carau |
| 2004/0068536 | A1 | 4/2004 | Demers |
| 2004/0255322 | A1 | 12/2004 | Meadows et al. |
| 2005/0086069 | A1 | 4/2005 | Watson et al. |
| 2005/0108751 | A1 | 5/2005 | DaCosta |
| 2005/0132398 | A1 | 6/2005 | Baran |
| 2005/0144024 | A1 | 6/2005 | Wojton et al. |
| 2005/0267813 | A1 | 12/2005 | Monday |
| 2006/0015925 | A1 | 1/2006 | Logan |
| 2006/0053342 | A1 | 3/2006 | Bazakos et al. |
| 2006/0110136 | A1 | 5/2006 | Abecassis |
| 2006/0123451 | A1 | 6/2006 | Preisman |
| 2006/0184579 | A1 | 8/2006 | Mills et al. |
| 2006/0291483 | A1 | 12/2006 | Sela |
| 2007/0055997 | A1 | 3/2007 | Witwer |
| 2007/0106557 | A1 | 5/2007 | Varghese |
| 2008/0002892 | A1 | 1/2008 | Jelonek et al. |
| 2008/0015864 | A1 | 1/2008 | Ross et al. |
| 2008/0089659 | A1 | 4/2008 | Clapper |
| 2008/0115161 | A1 | 5/2008 | Kurzion |
| 2008/0115655 | A1 | 5/2008 | Weng et al. |
| 2008/0134229 | A1 | 6/2008 | Conant |
| 2008/0187279 | A1 | 8/2008 | Gilley |
| 2008/0221986 | A1 | 9/2008 | Soicher et al. |
| 2008/0282283 | A1 | 11/2008 | Hilton et al. |
| 2008/0295129 | A1 | 11/2008 | Laut |
| 2009/0116695 | A1 | 5/2009 | Anchyshkin et al. |
| 2009/0133051 | A1 | 5/2009 | Hildreth |
| 2009/0196464 | A1 | 8/2009 | Dimitrova et al. |
| 2009/0210902 | A1 | 8/2009 | Slaney et al. |
| 2009/0217315 | A1 | 8/2009 | Malik et al. |
| 2009/0217316 | A1 | 8/2009 | Gupta |
| 2009/0281908 | A1 | 11/2009 | Wong |
| 2009/0285454 | A1 | 11/2009 | Xu |
| 2009/0299752 | A1 | 12/2009 | Rodriguez et al. |
| 2010/0007726 | A1 | 1/2010 | Barbieri et al. |
| 2010/0008547 | A1 | 1/2010 | Yagnik et al. |
| 2010/0067745 | A1 | 3/2010 | Kovtun et al. |
| 2010/0131385 | A1 | 5/2010 | Harrang et al. |
| 2010/0141787 | A1 | 6/2010 | Bigioi et al. |
| 2010/0162289 | A1 | 6/2010 | Sanders |
| 2010/0256561 | A1 | 10/2010 | Gillespie, Jr. et al. |
| 2010/0283741 | A1 | 11/2010 | Heintze et al. |
| 2010/0332570 | A1 | 12/2010 | Roberts et al. |
| 2011/0052012 | A1 | 3/2011 | Bambha et al. |
| 2011/0129126 | A1 | 6/2011 | Begeja et al. |
| 2011/0137753 | A1 | 6/2011 | Moehrle |
| 2011/0138326 | A1 | 6/2011 | Roberts et al. |
| 2011/0150295 | A1 | 6/2011 | Eckhoff et al. |
| 2011/0150296 | A1 | 6/2011 | Eckhoff et al. |
| 2011/0150297 | A1 | 6/2011 | Eckhoff et al. |
| 2011/0150298 | A1 | 6/2011 | Eckhoff et al. |
| 2011/0150299 | A1 | 6/2011 | Eckhoff et al. |
| 2011/0231757 | A1 | 9/2011 | Haddick et al. |
| 2011/0276334 | A1 | 11/2011 | Wang et al. |
| 2011/0310580 | A1 | 12/2011 | Leung |
| 2012/0007891 | A1 | 1/2012 | Chiang |
| 2012/0016678 | A1 | 1/2012 | Gruber et al. |
| 2012/0072936 | A1 | 3/2012 | Small et al. |
| 2012/0084811 | A1 | 4/2012 | Thompson et al. |
| 2012/0110620 | A1 | 5/2012 | Kilar et al. |
| 2013/0036011 | A1 | 2/2013 | Roberts |
| 2014/0071168 | A1* | 3/2014 | Berglund ................ G06T 11/60 345/660 |
| 2017/0116160 | A1 | 4/2017 | Mentchoukov et al. |
| 2018/0314889 | A1 | 11/2018 | Fukazawa et al. |
| 2020/0196014 | A1 | 6/2020 | Shah et al. |
| 2020/0319778 | A1 | 10/2020 | Lewbel et al. |
| 2023/0254536 | A1 | 8/2023 | Benea et al. |
| 2024/0348875 | A1 | 10/2024 | Benea et al. |

* cited by examiner

CONTENT ITEM POSITIONING

BACKGROUND

Field

This disclosure is generally directed to strategically placing content items on certain display regions and/or displays/screens, and more particularly to strategically placing different content across different displays/screens in a multi-display environment.

SUMMARY

Provided herein are system, apparatus, article of manufacture, method and/or computer program product embodiments, and/or combinations and sub-combinations thereof, for content item positioning. In some aspects, a method is provided for content item positioning. An example method can include obtaining a first content item including video data for display at a first display device and, based on the video data, generating a saliency map of the first content item. The saliency map can identify a plurality of regions of the first content item and each region of the plurality of regions can be associated with a saliency value. The method can also include determining, based on the saliency map, whether one or more regions of the plurality of regions have a saliency value that is below a predetermined saliency value and, based on the determining whether the one or more regions have a saliency value that is below a predetermined saliency value, determining whether to insert a second content item within the one or more regions of the first content item or within a display region of a second display device.

In some aspects, a system is provided for content item positioning. In some examples, the system can include a computing device(s), such as a server computer, a desktop computer, a set-top box, an Internet-of-Things (IoT) device, a peripheral device, a mobile device (e.g., a laptop computer, a tablet computer, a mobile phone or smartphone, etc.), a wearable computing device (e.g., a smartwatch, smart-glasses, a head-mounted display (HMD), extended reality (e.g., virtual reality, augmented reality, mixed reality, virtual reality with video passthrough, etc.) glasses, etc.), a single-board computer (SBC) or system-on-chip (SoC) device, an edge device, a smart device (e.g., a smart television, a smart appliance, etc.), among others.

The system can include memory used to store data, such as computing instructions, and one or more processors coupled to the memory and configured to obtain a first content item including video data for display at a first display device and, based on the video data, generate a saliency map of the first content item. The saliency map can identify a plurality of regions of the first content item and each region of the plurality of regions can be associated with a saliency value. The one or more processors can be further configured to determine, based on the saliency map, whether one or more regions of the plurality of regions have a saliency value that is below a predetermined saliency value and, based on the determining whether the one or more regions have a saliency value that is below a predetermined saliency value, determine whether to insert a second content item within the one or more regions of the first content item or within a display region of a second display device.

In some aspects, a non-transitory computer-readable medium is provided for determining a configuration of secondary content presented to a user during a session associated with primary content. In some cases, the non-transitory computer-readable medium can have instructions stored thereon that, when executed by one or more processors, cause the one or more processors to obtain a first content item including video data for display at a first display device and, based on the video data, generate a saliency map of the first content item. The saliency map can identify a plurality of regions of the first content item and each region of the plurality of regions can be associated with a saliency value. The instructions can further cause the one or more processors to determine, based on the saliency map, whether one or more regions of the plurality of regions have a saliency value that is below a predetermined saliency value and, based on the determining whether the one or more regions have a saliency value that is below a predetermined saliency value, determine whether to insert a second content item within the one or more regions of the first content item or within a display region of a second display device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
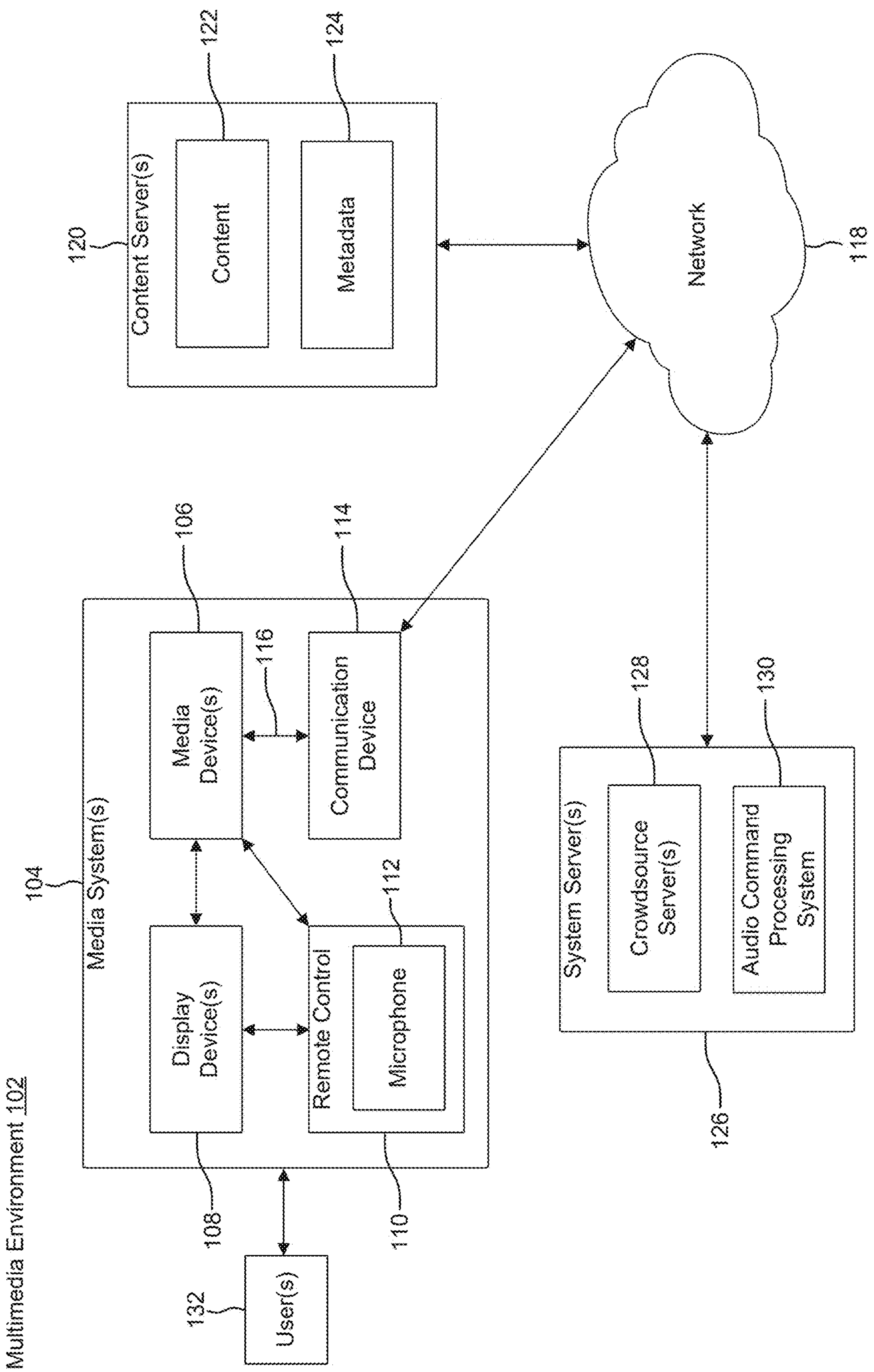
FIG. 1 illustrates a block diagram of a multimedia environment, according to some examples of the present disclosure.

A computing device (e.g., a monitor, television (TV), computer, smart phone, tablet, wearable (such as a watch or glasses), appliance, internet of things (IoT) device, and/or projector) may be configured to provide a primary content item (e.g., movies, television shows, podcasts, videos, livestreams, etc.) to a display device for presentation at the display device. In some cases, while the primary content item is displayed by the display device, the computing device may provide a secondary content item (e.g., digital content such as an advertisement) to the display device or a different display device for presentation. In such cases, the viewing experience for the user may be diminished due to periodic interruptions of the presentation of the primary content item, caused by the concurrent presentation of the secondary content item. Further, the diminished experience may increase the likelihood of user abandonment of the primary content item.

For example, a primary content item may be a television show associated with amateur baking and a secondary content item may be one or more advertisements. While the display device displays the TV show, the display device may periodically and abruptly interrupt the presentation of the television show to present a secondary content item, such as a full screen advertisement. In cases in which the frequency of interrupting the presentation of the primary content to present secondary content (e.g., full screen advertisements) is too high (or above a threshold), a user viewing the television show may have a diminished viewing experience due to the interruptions of the secondary content (e.g., the full screen advertisements). As a result, the user may become frustrated by the interruptions and lose interest in the primary content and/or the secondary content.

Provided herein are system, apparatus, device, method and/or computer program product embodiments, and/or combinations and sub-combinations thereof, for the strategic placement of content items across displays/screens in multi-display environments. In some aspects, a primary content item may be displayed by/on a display device, such as a monitor, a television, a head-mounted display (HMD), smart glasses, a projector, etc., and a secondary content item can be concurrently displayed on the same display device (e.g., within a portion of the primary content item such as within a region of interest, or within a region of the display area of the display device that does not include the primary content item) or on a different display device. The primary content item and the secondary content item can each include image data, audio data (e.g., music, speech/dialogue, sounds/noise, etc.), video data, text data (e.g., subtitles, text messages, closed captions, etc.), and/or any other type of media content. For example, in some cases, the primary content item can include a television show, a movie, a podcast, a live stream, an audiobook, a radio transmission, a media clip, or a set of images, and the secondary content item can include an advertisement, a logo, an audio data (e.g., an audio message, speech, dialogue, music, etc.), an image, or text data (e.g., subtitles, a text message or announcement, closed captions, etc.).

In some aspects, the system, apparatus, device, method and/or computer program product embodiments (and/or combinations and sub-combinations thereof) provided herein may process data of the primary content item, such as video frames or images of the primary content item, to determine one or more regions of interest on which to place or insert (e.g., for display and/or playback) the secondary content item, such as a region of interest within the primary content item and/or a region of interest within a different display than a display presenting the primary content item. In some instances, the determination of the one or more regions of interest on which to place or insert the secondary content item may be based on, for example and without limitation, a level of activity depicted in the primary content item (e.g., activity in one or more video frames or images of the primary content item, etc.), an attention of a user consuming (e.g., viewing and/or listening to) the primary content item, an engagement of the user with the primary content item (e.g., a behavior of the user indicating user engagement or lack thereof such as interactions with the primary content item, interactions with related content, responses or lack of responses to a prompt provided to the user, user activity indicating that the user is distracted or engaged with the content, etc.), a degree of importance and/or relevance of a portion(s) of content of the primary content item (e.g., an importance and/or relevance to a plot associated with the primary content item, a story associated with the primary content item, a message associated with the primary content item, an event associated with the primary content item, etc.) and/or a degree of importance and/or relevance of the portion(s) of content of the primary content item relative to other portions of content of the primary content item (e.g., a degree of importance or relevance of one or more displayed objects, digital content (e.g., audio, visual, and/or text content associated with the primary content item, etc.), a background and/or foreground of a content of the primary content item, characteristics of a display device displaying the primary content item, a number of additional display devices (and/or characteristics thereof) available for displaying the secondary content item, a pattern of content associated with the primary content item, characteristics of one or more portions of the primary content item, etc.

In some examples, the display device and/or display region used to display the secondary content item can be selected to allow the secondary content item to be displayed concurrently with the primary content item without interrupting the primary content item, without obfuscating the primary content item or obstructing the user's view of the primary content item, without degrading the viewing experience of the user viewing the primary content item and the secondary content item, etc. In some aspects, the primary content item may be displayed on one display device, while the secondary content item may be displayed on a separate display device. For example, if the primary content item is displayed on a first display device and a second display device is available for displaying the secondary content item, the secondary content item can be displayed on the second display device to allow the secondary content item to be displayed concurrently with the primary content item without obfuscating the primary content item (e.g., without blocking the user's visibility of the primary content item). In such aspects, the system, apparatus, device, method and/or computer program product embodiments (and/or combinations and sub-combinations thereof) provided herein may determine or detect whether there are multiple display devices available in the multimedia environment (e.g., connected to the computing device of the user and/or a source of the content to be displayed) that can be used to display the primary and secondary content items. For example, the computing device of the user can detect the number of display devices that the computing device is connected to (e.g., via wired and/or wireless connections). Moreover, if the computing system of the user is connected to multiple display devices, the system, apparatus, device, method and/or computer program product embodiments (and/or combinations and sub-combinations thereof) provided herein may determine which display device of the multiple display devices is displaying or is to display the primary content item, and which display device should display the secondary content item. In some examples, the system, apparatus, device, method and/or computer program product embodiments (and/or combinations and sub-combinations thereof) provided herein may determine to display the secondary content item on a same display device as the primary content item or another display device.

In some instances, the system, apparatus, device, method and/or computer program product embodiments (and/or combinations and sub-combinations thereof) provided herein may intelligently determine when to display the secondary content item. For instance, the system, apparatus, device, method and/or computer program product embodiments (and/or combinations and sub-combinations thereof) provided herein may determine instances of the primary content item that has a low amount of dialogue or no dialogue. Based on such determination, the system, apparatus, device, method and/or computer program product embodiments (and/or combinations and sub-combinations thereof) provided herein may strategically place one or more portions of the secondary content item (e.g., one or more videoframes or images of the secondary content items) on one or more regions of interests of video frames associated with such instances.

Further, the system, apparatus, device, method and/or computer program product embodiments (and/or combinations and sub-combinations thereof) provided herein may monitor each display device displaying content associated with the primary and/or secondary content item, to obtain data identifying or characterizing one or more user interactions with the secondary content item (e.g., one or more video frames or images of the secondary content item) and/or the primary content item (e.g., one or more video frames or images of the primary content item), such as any interactions of the user with the secondary content item, an attention of the user with respect to the primary content item and/or the secondary content item. In some cases, the timing, placement, presentation, and/or characteristics of the secondary content item can be determined based on data about the multimedia environment (e.g., number and/or types of available display devices, ambient conditions, available output devices, etc.), data about the primary and/or secondary content item, data about the user (e.g., demographics, preferences, statistics, profile data, attention data, etc.). In some examples, the data about the user can include data about an attention of the user with respect to the primary content item and/or the secondary content item. In some examples, the attention of the user can be determined based on an interaction by the user with content associated with the primary and/or secondary content item, user activity, lack of expected user activity (e.g., a reply to a prompt, etc.) or confirmation that expected user activity has occurred, an amount of time the user is idle (e.g., an amount of time since a previous (or any) input by the user), user activity captured by a camera device (with informed consent from the user) indicating whether the user is engaged with the primary and/or secondary content item or something else, a type of input (or lack thereof) received by the computing device of the user during a playback of content (e.g., the primary content item, the secondary content item, a prompt, and/or any other content), etc.

The system, apparatus, device, method and/or computer program product embodiments (and/or combinations and sub-combinations thereof) provided herein may use the data (e.g., data about the multimedia environment, data about the user, data about the content, etc.) to adjust the secondary content item, such as reposition the secondary content item, modify a playback of the secondary content item, modify a presentation characteristic of the secondary content item (e.g., modify a size and/or aspect ratio of the secondary content item, modify a color and/or brightness of the secondary content item, modify a behavior of the secondary content item, etc.), and/or any other adjustments. Moreover, the apparatus, device, method and/or computer program product embodiments (and/or combinations and sub-combinations thereof) provided herein may use the data to adjust one or more portions or regions of the primary content item. For instance, the bit rate of one or more regions or portions of the primary content item may be adjusted based on the data. The adjustments to the bit rate may, for example and without limitation, lower the computing processing requirements to display the video frames or may increase the presentation quality and/or performance of the video frames.

In some examples, the strategic placement of different content across different display devices, display or screens in a multi-display environment may be determined by an artificial intelligence (AI) or machine learning (ML) algorithm(s) or process, such as a saliency detection AI/ML model, a segmentation AI/ML model (e.g., salient object segmentation, background-foreground segmentation, feature segmentation, pose segmentation, instance segmentation, semantic segmentation, etc.), an object detection AI/ML model, a recognition AI/ML model (e.g., object recognition, face recognition, action recognition, speech recognition, gesture recognition, scene recognition, etc.), a pose estimation AI/ML model, a user attention estimation/tracking AI/ML model, an image classification AI/ML model, an object tracking AI/ML model, a regression AI/ML model, a clustering AI/ML model, a localization AI/ML model, a large language model (LLM), a visual saliency AI/ML model, a ranking AI/ML model, a prediction AI/ML model, a computer vision AI/ML model, a language generation and/or natural language processing AI/ML model, an image processing AI/ML model, and/or any other AI/ML model. For example, an AI/ML process (cs) or algorithm(s) may be used to determine the one or more regions of interest of the primary content item to place or insert the secondary content item. In some cases, the timing of when to display the secondary content item with the primary content item may be determined by an AI or ML algorithm(s) or process (es).

In some cases, the primary content item and/or the secondary content item may include audio data and/or audio related text data, such as subtitles or closed-captioning. If the display device concurrently displays the primary content item and the secondary content item, the display device may also concurrently output the audio data of the primary content item and the audio-related text data of the secondary content item, or vice versa. In such cases, outputting the audio-related text data of the primary content item or the secondary content item may allow the user to receive the information corresponding to the audio of both the primary and secondary content item, as otherwise concurrently outputting the audio data of the primary content item and the audio data of the secondary content item may diminish the viewing experience for the user as it may be disruptive for the user trying to view and listen to the primary content item.

For example, the display device may display a television show about vault dwellers in a post-apocalyptic world (e.g., the primary content item). While the display device displays the television show, the display device also displays, every so often, one or more secondary content items on one or more regions of the displayed television show. However, the display device may also output the audio data of the one or more secondary content items while outputting the audio data of the television show. In some instances, the display device may output the audio data of the one or more secondary content items during scenes of the television show where there is no dialogue or lower dialogue to prevent or reduce disruptions to the user's viewing experience.

The system, apparatus, device, method and/or computer program product embodiments, and/or combinations and sub-combinations thereof, described herein can determine whether to output the audio data of the primary content item or the audio data of the secondary content item, while the primary content item is displayed by a device. In cases where the audio data of the primary content item is outputted by the device, a display device (e.g., the same device or a separate device with display capabilities) may output an audio-related text data of the secondary content item. In cases where an audio-related text data of the primary content item is outputted by the device, the device may concurrently output audio-related text data of the secondary content item and/or the audio data of the secondary content item. In cases where the audio-related text data of the secondary content item is determined to be outputted by the device, the system, apparatus, device, method and/or computer program product embodiments (and/or combinations and sub-combinations thereof) provided herein may determine one or more regions of the device or a separate display device to place or insert the secondary content item. In such aspects, such placement or insertion may be based on the positioning of the audio-related text data of the primary content item or the secondary content item.

In some cases, the secondary content item may be displayed on a display device separate from a display device displaying the primary content item. In such cases, a user, such as user 132, may continue viewing the primary content item and allow the user to also view the secondary content item without obfuscating/disrupting the primary content item or negatively affecting the ability of the user to view the primary content item while the secondary content item is displayed on the separate display device.

In some examples, the system, apparatus, device, method and/or computer program product embodiments, and/or combinations and sub-combinations thereof, provided herein can enable interactions between the user and a secondary content item displayed by another display device separate from the display device displaying the primary content item. In some aspects, the system, apparatus, device, method and/or computer program product embodiments (and/or combinations and sub-combinations thereof) provided herein may monitor the other display device and obtain data indicating or characterizing one or more interactions between the user and the secondary content item displayed on the other display device. Based on the data, the system, apparatus, device, method and/or computer program product embodiments (and/or combinations and sub-combinations thereof) provided herein may determine whether the interactions between the user and the secondary content item satisfies an interaction threshold. In some cases, if the interactions between the user and the secondary content item does not satisfy the interaction threshold, the system, apparatus, device, method and/or computer program product embodiments (and/or combinations and sub-combinations thereof) provided herein may prevent the user from further viewing the primary content item being displayed on the corresponding display device (e.g., blacking out the display of the display device or obfuscating the primary content item being displayed on the corresponding display device).

As used herein, the attention level of a user (or user attention level) can mean or can include, among other things, a focus or eye gaze of the user and/or a direction in which the user (e.g., the user's face) is facing (e.g., a position of the face, an orientation of the face, etc.). For example, the attention level of a user can include or indicate a direction in which the user's face is facing and/or an eye gaze of the user. Moreover, as used herein, attention data can include, among other things, data indicating or tracking an attention level of the user such as, for example, a focus, eye gaze, and/or face pose/direction of a user. In some cases, the eye gaze of the user can be determined using any eye gaze detection, estimation, and/or tracking algorithm(s)/model(s), such as an AI/ML neural network model, and the direction in which the user (e.g., the user's face) is facing can be determined using any face detection or face direction detection algorithm(s)/model(s), such as an AI/ML face detection model. In some cases, the face direction and/or the eye gaze of a user can be determined relative to a display associated with the user and/or content (e.g., primary content, secondary content, and/or any content) displayed on a display device associated with the user, in order to determine the attention level of the user with respect to the display and/or the content displayed on the display. In some examples, the attention level of the user relative to a content item (or anything else) can include whether a user is focused on or paying attention to the content item as determined based on an eye gaze of the user, a face pose or direction of the user, a user input from the user, one or more user interactions, one or more user gestures, and/or any other relevant information.

In some aspects, a user attention estimation/tracking algorithm/model can include, for example and without limitation, an eye gaze detection/tracking algorithm/model, such as an eye gaze estimation/tracking AI/ML model, and/or a face or face direction detection/tracking algorithm/model, such as a face detection AI/ML model. In some examples, the attention level of the user can be detected, estimated, and/or tracked based on data collected from one or more sensors (with consent from the user). For example, a user attention level estimation/tracking algorithm, such as an AI/ML use attention estimation model, can process image data collected from an image/camera sensor (e.g., with user consent) that depicts the eyes (or face) of the user to detect and/or track an attention level of the user. As noted below, the user attention level estimation/tracking can be performed with consent from the user, and sensor data used to detect/track a user attention level can be collected with consent from the user. Such information can be managed, secured, and protected according to user preferences, industry standards, privacy expectations, and government requirements.

The present disclosure recognizes that the use of personal information data can be used to the benefit of users. For example, personal information data can be used to better understand user behavior, facilitate and measure the effectiveness of applications and delivered digital content. Accordingly, use of such personal information data enables calculated control of the delivered digital content. For example, the system can reduce the number of times a user receives certain content and can thereby select and deliver content that is more meaningful to users. Such changes in system behavior improve the user experience. Further, other uses for personal information data that benefit the user are also contemplated by the present disclosure. The present disclosure further contemplates that the entities responsible for the collection, analysis, disclosure, transfer, storage, or other use of such personal information data should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after the informed consent of the users. Additionally, such entities would take any needed steps for safeguarding and securing access to such personal information data and ensuring that others with access to the personal information data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. Moreover, the present disclosure includes mechanisms which can be implemented to protect the privacy of users and anonymize data collected. Although the present disclosure may cover use of personal information data to implement one or more various disclosed embodiments, the present disclosure also contemplates that the various embodiments can also be implemented without the need for accessing and/or reporting such personal information data and/or with protections to maintain the user's privacy. The various embodiments of the present technology are not rendered inoperable due to the lack of all or a portion of such personal information data.

Various embodiments and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include primary content or content items and secondary content or content items. As described herein, primary content or content items may include any combination of music, videos, movies, TV programs, multimedia, images, still pictures, text, graphics, gaming applications, advertisements, programming content, public service content, government content, local community content, software, promotional item (e.g., an advertisement of any one of the described examples of primary content item) and/or any other content or data objects in electronic form. Moreover, secondary content or content items may include a content item provided by a third-party content provider, such as an advertisement.

In some examples, metadata 124 comprises data about content 122 (e.g., primary content and/or secondary content). For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
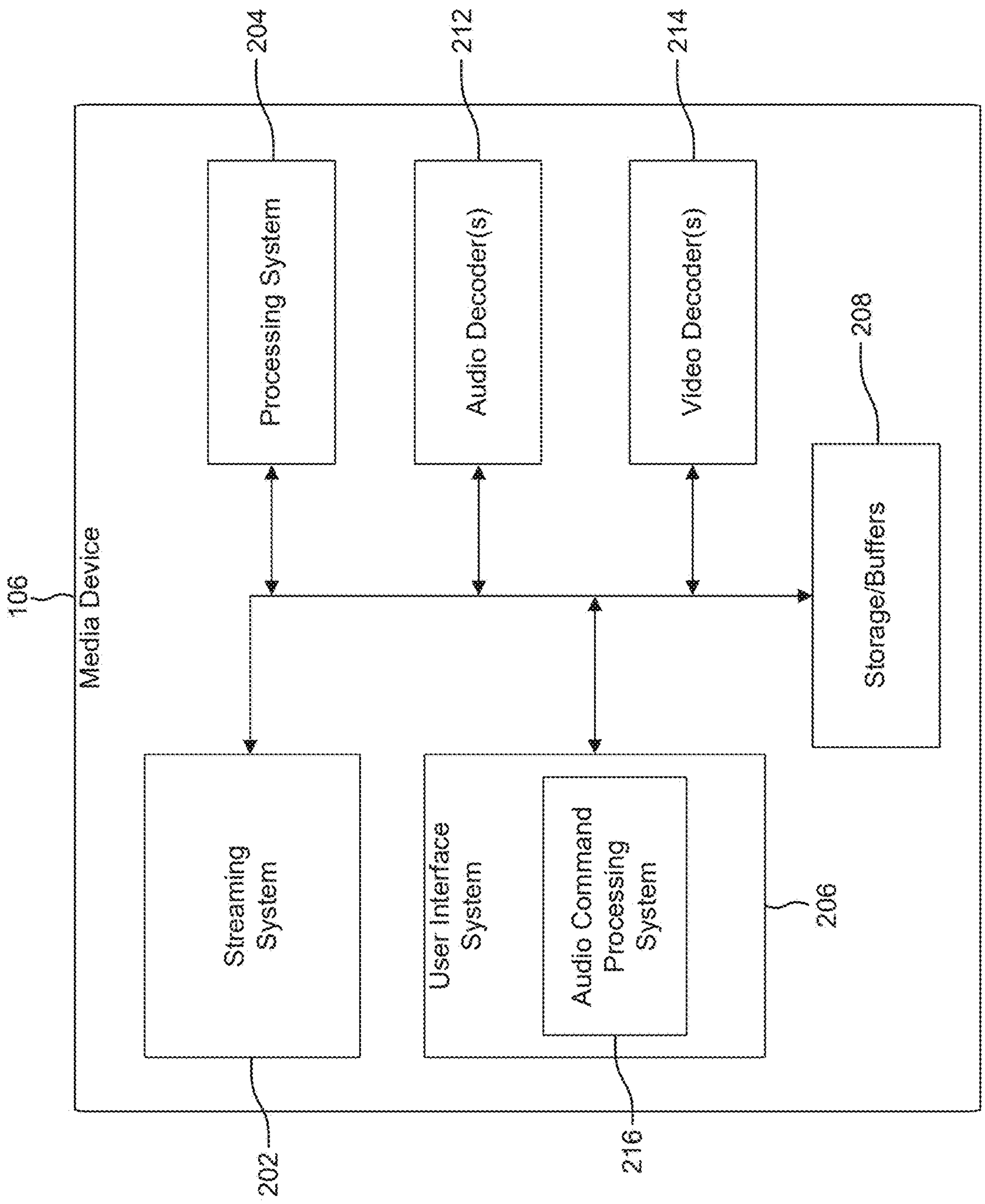
FIG. 2 illustrates a block diagram of a streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, VVC, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, VVC, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Example Processes for Positioning or Inserting a Secondary Content Item on One or More Regions of Interest of a Primary Content Item Referring to FIG. 3, example content placement system 302 may implement operations to perform the example processes described herein. In some examples, and without limitation, content placement system 302 may insert, place or position one or more portions of a secondary content item (e.g., one or more video frames or images of the secondary content item) within a region of interest in a display of a display device. In some instances, the display may be a display displaying the primary content item or a different display (e.g., a different display device). In cases where the secondary content item and the primary content item are displayed on the same display, the additional computing systems may determine where within the primary content item (e.g., one or more video frames or images of the primary content item) to place or insert the secondary content item. Otherwise, the secondary content item and the primary content item may be displayed on different displays to avoid the primary content item from being obfuscated by the secondary content item. In some instances, content placement system 302 may be included in multimedia environment 102.

Figure 3A:
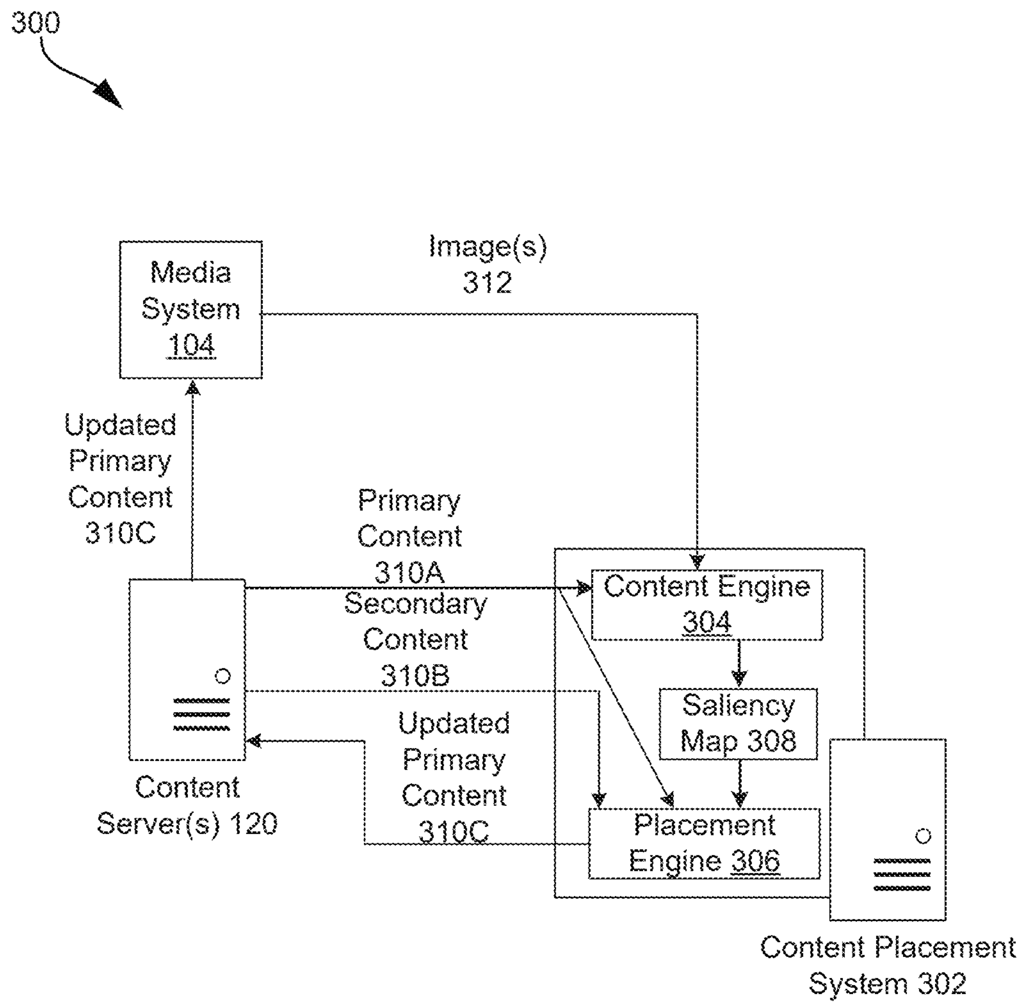
FIG. 3A illustrates an example system process for positioning or inserting a secondary content item on one or more regions of interest of a primary content item and/or a particular display/screen in a multi-display environment.

In some examples, content placement system 302 may include, be part of, and/or be implemented by one or more hardware and/or virtual systems such as, for example and without limitation, one or more server computers, datacenters and/or datacenter devices, cloud computing infrastructure devices/components, software containers, virtual machines, computer devices, cloud application services, and/or any other computing systems. As illustrated in FIG. 3A, content placement system 302 may include content engine 304 and placement engine 306. In some instances, content engine 304 and/or placement engine 306 can each include or represent one or more software models and/or algorithms. For example, content engine 304 and/or placement engine 306 may each include or represent one or more artificial intelligence (AI) or machine learning (ML) processes, algorithms or models such as, for example and without limitation, a saliency detection AI/ML model, a segmentation AI/ML model (e.g., object segmentation, background-foreground segmentation, feature segmentation, pose segmentation, instance segmentation, semantic segmentation, etc.), an object detection AI/ML model, an image captioning AI/ML model, a visual tracking AI/ML model, a recognition AI/ML model (e.g., object recognition, face recognition, gesture recognition, action recognition, speech recognition, scene recognition, etc.), a pose estimation AI/ML model, a user attention tracking AI/ML model, an image classification AI/ML model, an object tracking AI/ML model, a regression AI/ML model, a clustering AI/ML model, a localization AI/ML model, a large language model (LLM), a visual saliency AI/ML model, a ranking AI/ML model, a prediction AI/ML model, a content generator AI/ML model, a computer vision AI/ML model, a language generation and/or natural language processing AI/ML model, an image processing AI/ML model, and/or any other AI/ML model. In some cases, content engine 304 and/or placement engine 306 may each additionally or alternatively include or represent one or more other types of models/algorithms such as, for example, one or more heuristic algorithms.

In some aspects, the primary content item may be a content item a user of display device 108 and/or media devices 106 has selected for display device 108 to display. As described herein, examples of primary content items that the user of display device 108 and/or media device 106 may select include, but are not limited to, movies, television shows, podcasts, videos, livestreams, media channels, and applications. In some instances, the primary content item may include audio data (e.g., data associated with music, sounds and/or dialogue of the primary content item) and/or audio-related text data (e.g., closed captioning, subtitles, etc.). Moreover, as previously described, the secondary content item may be a content item (e.g., an advertisement) provided by a third-party content provider or otherwise associated with a third party. In some instances, the secondary content item may be a content item (e.g., a promotional content item) stored and/or generated by content server(s) 120 and/or another computing system included in multimedia environment 102. In some cases, the secondary content item may be a video (e.g., a commercial) or an image. In some cases, the secondary content item may include audio data (e.g., data associated with music, sounds and/or dialogue of the primary content item) and/or audio-related text data (e.g., closed captioning, subtitles, etc.).

In some examples, content placement system 302 may insert or position one or more portions of a secondary content item onto one or more video frames or images of the primary content item by determining one or more regions of interest within a display presenting the primary content item (e.g., within one or more video frames of the primary content item) or within a separate display. Moreover, content placement system 302 may insert or place the portions of the secondary content item onto the determined regions of interest of the video frames of the primary content item. The updated primary content item (e.g., the primary content item with the inserted or placed portions of the secondary content item), such as updated primary content 122C, may be provided or transmitted by content placement system 302 to content server(s) 120. That way, media system 104, such as media device 106 and/or display device 108, may access the updated primary content item and display or play the primary content item with the inserted secondary content item.

As described herein, content placement system 302 may determine the regions of interest of one or more video frames of the primary content item. The regions of interest may be positions, portions, regions or areas on the video frames of the primary content item that one or more video frames or images of a secondary content item may be placed or inserted on. In some aspects, one or more processors of content placement system 302 may execute content engine 304 to perform any of the described example processes to determine the regions of interest of the video frames of the primary content item. Moreover, the processors of content placement system 302 may execute placement engine 306 to perform any of the described example processes to place or insert the video frames or images of a secondary content item on the determined regions of interest.

Figure 3B:
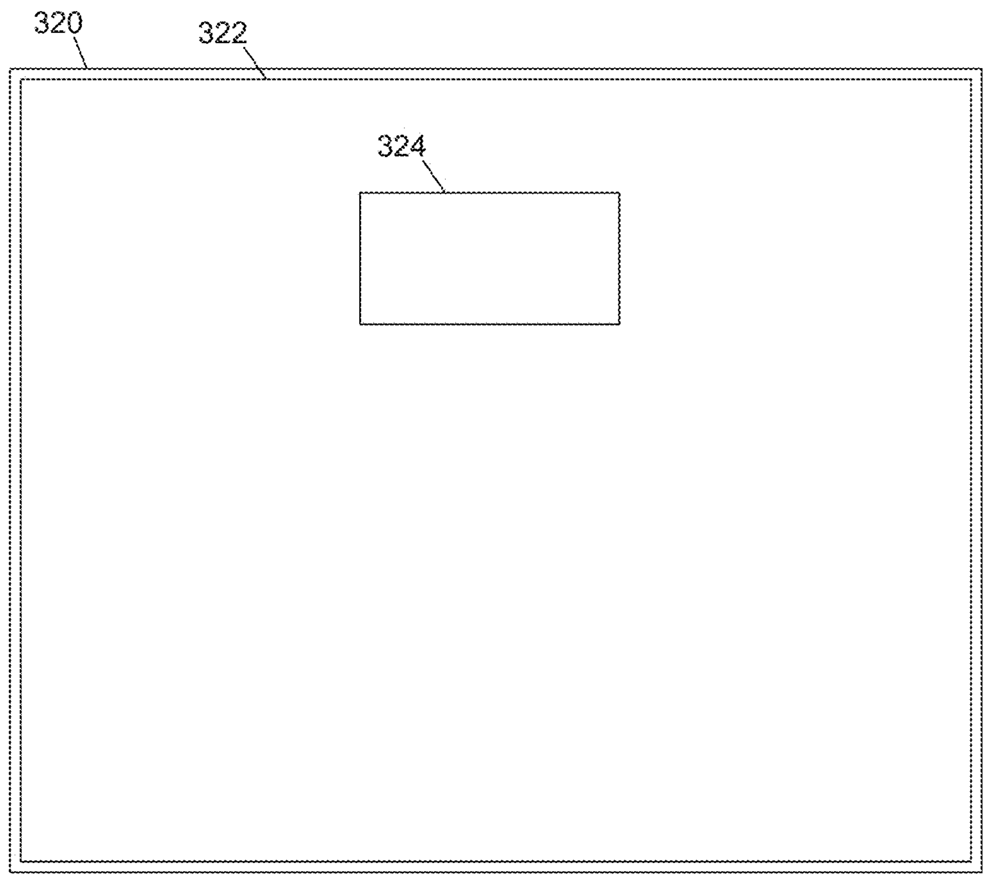
FIGS. 3B-3G illustrate example displays and/or display configurations of the primary content item with the secondary content item.

As previously described, content server(s) 120 may store content 122. Moreover, content 122 may include primary content or content items, such as primary content 310A and/or secondary content or content items, such as secondary content 310B. Moreover, each of the primary content items may include audio data, audio-related text data, and/or video data and each of the secondary content items may include audio data, audio-related text data, and/or video data. Further, content server(s) 120 may transmit primary content items and/or secondary content items to content placement system 302. In some instances, the secondary content items may be transmitted from a third-party computing system. In some cases, content engine 304 may determine the regions of interest of one or more video frames or images of each of the primary content items. In some cases, placement engine 306 may update the primary content items (e.g., updated primary content 122C) by inserting or placing one or more portions of the secondary content items (e.g., one or more video frames or images) on the determined regions of interest of the video frames or images of the primary content items. Moreover, placement engine 306 may transmit the updated primary content items to content server(s) 120. Further, media system 104 may access the updated primary content items. For instance, a user of multimedia environment 102 may operate media device 106 and/or display device 108 to access the updated primary content items and display or play the updated primary content items (e.g., display each of the video frames of the primary content item, including the placed or inserted video frames of the secondary content item). For example, as illustrated in FIG. 3B, display device 108 may present or display on display 320 of display device 108 a video frame of primary content 310A, such as video frame 322, including a video frame or image of secondary content 310B, such as video frame 324, on a region of interest of the video frame of primary content 310A.

Referring back to FIG. 3A, and in some aspects, content engine 304 may determine, for one or more portions (e.g., video frames, etc.) of the primary content item, the regions of interest based on data such as attention data (e.g., an estimated level of attention/engagement of a user with the primary content), data about the primary content item, data about the secondary content item, context data (e.g., location data, environment data (e.g., type of environment, ambient light levels, etc.), device data (e.g., data about the media system 104 of the user, data indicating the type (and/or characteristics and/or settings) and/or number of output devices (e.g., display devices, speakers, etc.) connected to the media system 104 of the user and/or available for use by the media system 104 to output content, performance data/metrics, demographics data, user statistics, saliency data (e.g., a saliency value of a region/portion of the primary content item and/or respective saliency values for each region or portion of the primary content item), detection/recognition data, activity data, prediction results, preference data, segmentation data, visual saliency data, and/or any other type of data. As described herein, content engine 304 may process the content (e.g., video frames, etc.) of the primary content item to determine a saliency value for one or more portions of the primary content item. In some examples, a saliency value may indicate, for a corresponding portion/region of content (e.g., a portion/region of the primary content item), a value quantifying and/or estimating how much the portion/region of content stands out from surrounding regions or portions of content, how much human visual attention the portion/region is estimated/predicted to attract and/or a probability that the portion/region will attract human visual attention over other portions/regions of content, a measurement of visual features associated with the portion/region of content, a likelihood that a user will focus on that portion/region of content before other portions/regions of content (and/or a ranking indicating a user's predicted/estimated focus on the portion/region of content relative to other portions/regions of content), a measurement or representation of a user attention (e.g., focus, attention by a human visual system, etc.) that the portion/region of content is predicted/estimated to receive or attract (e.g., how much attention/focus, an order or priority of focus/attention relative to other portions/regions of content, etc.), a visual distinctiveness relative to other portions/regions of content, a visual stimulus, a prediction of an attention level of a user with respect to the portion/region of content, a predicted response/behavior of a human attention mechanism/system to the portion/region of content, a measurement of visual attention, a prediction and/or estimate of a distinct perceptual quality of the portion/region of content, and/or any other characteristic, interpretation, and/or information conveyed by any saliency detection/determination algorithms recognized/understood by one of skill in the art based on the disclosure and the term saliency as understood by one of skill in the art.

The saliency value can be determined based on one or more factors associated with the content such as, for example and without limitation, content features, content brightness levels, visual distinctive objects and/or shapes, content orientation, colors, luminance, motion, texture, contrast, background and foreground features, image/feature segmentation, visual saliency, semantic meaning of elements in the content, and/or any other cues and/or visual characteristics associated with the content. In some examples, the saliency value may be based on one or more aspects of the content such as, for example and without limitation, a level of activity associated with the content (and/or a portion(s) thereof), characteristics of a background of the content, characteristics of a foreground of the content, whether a region or portion of the content corresponds to a background or foreground, whether the region or portion conveys information that is or is not relevant to understanding one or more details conveyed in previous and/or subsequent content (e.g., one or more previous or subsequent video frames), whether a region or portion of content corresponds to at least a portion of a semantic element (e.g., a sky, landscape, a building, a human, an animal, a street, an object, a shape, etc., content pattern characteristics of the content, etc. In some cases, content engine 304 may generate, for one or more portions of the primary content (e.g., for one or more video frames of the primary content item), saliency map 308 based on the corresponding aspects of the content. As described herein, saliency map 308 may identify a plurality of regions of the corresponding content and corresponding saliency value.

For example, content engine 304 may determine a saliency value for a particular region of a video frame based on a visual cue, a visual distinctiveness, a feature, a characteristic, and/or a level of activity determined for that particular region. Moreover, the activity level may be based on one or more objects detected by content engine 304 within the video frame. In some instances, and based on the detected objects, content engine 304 may determine corresponding portion(s) or region(s) of the video frame for each of the detected objects. Based on the corresponding portion(s) or region(s) of the video frame for each of the detected objects, content engine 304 may determine an object type and/or label each of the detected objects. Based on the corresponding portion(s) or region(s) of the video frame for each of the detected objects, content engine 304 may determine a spatial relationship of each of the detected objects and/or a position of each of the detected objects relative to each other. Based on the object type and/or label of each of the detected objects and the spatial relationship of each of the detected objects and/or a position of each of the detected objects relative to each other, content engine 304 may determine a level of activity for one or more of the detected objects and corresponding region(s) or portion(s) of the video frame. Moreover, content engine 304 may determine a saliency value corresponding to the level of activity. In some cases, the higher the level of activity the higher the saliency value or the greater the degree that the corresponding portion or region of the corresponding video frame stands out from surrounding regions or portions of the corresponding video frame.

For instance, content engine 304 may obtain primary content 310A from content server(s) 120. Based on primary content 310A, content engine 304 may detect, for a video frame of primary content 310A, a group of objects and empty space (e.g., sky) above the group of objects, and may determine that a subset of the group of objects are trees and two objects of the group of objects are two people. Moreover, content engine 304 may determine, for the two people, one person is facing left while the other person is facing the back of the person facing left, and may determine one person may be running away from the other. Further content engine 304 may determine the two people are in front of the trees and that there is an empty space (e.g., sky) above the trees. Taken together, content engine 304 may determine the level of activity for the regions of the video frame corresponding to the two people relative to the regions of the video frame corresponding to the trees and the regions of the video frame corresponding to the empty space, the level of activity for the regions of the video frame corresponding to the trees relative to the regions of the video frame corresponding to the two people and the regions of the video frame corresponding to the empty space, and the level of activity for the regions of the video frame corresponding to the empty space relative to the regions of the video frame corresponding to the trees and the regions of the video frame corresponding to the two people. Based on the determined level of activity for the regions of the video frame corresponding to the two people, the determined level of activity for the regions of the video frame corresponding to the trees, and determined level of activity for the regions of the video frame corresponding to the empty space, content engine 304 may determine a saliency value for the regions of the video frame corresponding to the two people, regions of the video frame corresponding to the trees, and regions of the video frame corresponding to the empty space, respectively. In such an instance, the saliency value may be higher for the regions of the video frame corresponding to the two people compared to the regions of the video frame corresponding to the trees, and the saliency value may be higher for the regions of the video frame corresponding to the trees compared to the regions of the video frame corresponding to the empty space.

In another example, a saliency value for a particular region of a video frame may be based on whether the particular region of the video frame is the foreground or background of the video frame. Moreover, whether the particular region of the video frame is in the foreground or background may be based on one or more objects detected, by content engine 304, within the video frame. In some instances, and based on the detected objects, content engine 304 may determine corresponding portion(s) or region(s) of the video frame for each of the detected objects. Based on the corresponding portion(s) or region(s) of the video frame for each of the detected objects, content engine 304 may determine a spatial relationship of each of the detected objects and/or a position of each of the detected objects relative to each other. Based on the spatial relationship of each of the detected objects with one another and/or a position of each of the detected objects relative to each other, content engine 304 may determine which of the detected objects are in the foreground of the video frame and which of the detected objects are in the background of the video frame. In some instances, detected objects determined to be in the foreground may have a higher saliency value than the detected objects determined to be in the background, and vice-versa.

For instance, content engine 304 may detect, for a video frame of a primary content item, a group of objects, such as a robot, a cyclops and a three-eyed alien creature. Moreover, content engine 304 may determine, for each of the robot, the cyclops and the three-eyed alien creature, corresponding portion(s) or region(s) of the video frame. Based on the corresponding portion(s) or region(s) of the video frame for the robot, the cyclops and the three-eyed alien creature, content engine 304 may a spatial relationship between each of the robot, the cyclops and the three-eyed alien creature and/or a position of each of the robot, the cyclops and the three-eyed alien creature relative to one another. Moreover, based on the spatial relationship between each of the robot, the cyclops and the three-eyed alien creature and/or a position of each of the robot, the cyclops and the three-eyed alien creature relative to one another, content engine 304 may determine whether each of the robot, the cyclops and the three-eyed alien creature are in the foreground or background of the video frame. Further, content engine 304 may determine a saliency value for each of the robot, the cyclops and the three-eyed alien creature based on whether Bender, Leela and Nibbler were each determined to be in the foreground or the background. In some instances, content engine 304 may determine the robot, the cyclops and/or the three-eyed alien creature may have a higher saliency value if content engine 304 determined the robot, the cyclops and/or the three-eyed alien creature were in the foreground and not the background, and vice-versa.

In another example, for a video frame, content engine 304 may determine a saliency value for a particular region of the video frame, based on content pattern characteristics of the video frame. Moreover, the content pattern characteristics may be based on one or more objects detected by content engine 304 within the video frame. In some instances, and based on the detected objects, content engine 304 may determine corresponding portion(s) or region(s) of the video frame for each of the detected objects. Based on the corresponding portion(s) or region(s) of the video frame for each of the detected objects, content engine 304 may determine a spatial relationship of each of the detected objects and/or a position of each of the detected objects relative to each other. Based on the spatial relationship of each of the detected objects and/or a position of each of the detected objects relative to each other, content engine 304 may determine which of the detected objects are within a predetermined distance threshold of one another and group objects that are within a predetermined distance threshold of one another. Based on the groups, content engine 304 may determine a saliency value corresponding to the number of objects within each group. In some cases, the greater the number of objects within each group, the greater the saliency value or the greater the degree that the corresponding portion or region of the corresponding video frame stands out from surrounding regions or portions of the corresponding video frame.

In some cases, content engine 304 may apply one or more AI/ML models such an object detection/recognition based AI/ML model, to the video frame. Based on the application of the one or more AI/ML models to the video frame, content engine 304 may perform any of the described examples processes to detect the one or more objects, determine the corresponding portion(s) or region(s) of the video frame for each of the detected objects, determine the object type of each of the detected objects and/or label each of the detected objects, determine a spatial relationship between each of the detected objects, determine which objects are within a predetermined distance threshold of one another, and/or determine whether the detected objects are in the foreground or background.

As previously described, placement engine 306 may place or insert one or more video frames or images of the secondary content item on the determined regions of interest of one or more video frames of the primary content item. For example, placement engine 306 may obtain saliency map 308 for each video frame of a primary content item. Based on saliency map 308 for each video frame of the primary content item, placement engine 306 may determine a saliency value for each region or portion of each video frame. Moreover, placement engine 306 may identify, for each video frame, which region or portion has a saliency value that is below a predetermined saliency value. As described herein, regions or portions of video frames that have saliency values that are higher than the predetermined saliency value may include content that may be interesting enough for users to not cover up or obscure by one or more video frames or images of the secondary content item. Regions or portions of video frames that have saliency values that are lower than the predetermined saliency value may include content that may not be interesting to the user. Further, placement engine 306 may place, for each video frame, one or more video frames or images of a secondary content item on the identified region or portion.

For instance, placement engine 306 may obtain, from content engine 304, saliency map 308 for a particular video frame of primary content 310A. Based on saliency map 308, placement engine 306 may determine one or more regions or portions of the video frame may have saliency values below a predetermined saliency value threshold. Moreover, placement engine 306 may obtain, from content server(s) 120, secondary content 310B. Further, placement engine 306 may place or insert one or more video frames or images of secondary content 310B on the determined one or more regions or portions of the video frame of primary content 310A.

In some aspects, for a secondary content item, such as secondary content 310B, the positioning or placement of the secondary content item may be different for each video frame of the primary content item, such as content 122. In such aspects, regions or portions of video frames may have the same positioning or location on each of the video frames, while having different saliency values. For instance, in a first video frame, a region of the first video frame may depict an empty space or the sky, and have a low saliency value because, for example, the region may correspond to a background of the first video frame or may not depict something that is important or relevant to the content of one or more previous video frames and/or subsequent video frames (e.g., a plot associated with the content, an event depicted in the content, etc.). By contrast, a particular region in a second video frame may depict an airplane or helicopter and have a higher saliency value that the region of the first video because, for example, the particular region corresponds to a foreground of the second video frame or the airplane or helicopter (and/or the particular region) may be important or relevant to the content of one or more previous video frames and/or subsequent video frames (e.g., a plot associated with the content, an event depicted in the content, etc.). Placement engine 306 may adjust the positioning of one or more video frames of the secondary content item from video frame to video frame. For instance, and following the example above, placement engine 306 may place a first video frame of the secondary content item in the region of the first video frame if the region has a saliency value below a predetermined saliency value threshold. Moreover, placement engine 306 may place a second video frame of the secondary content item in another region with a saliency value that is below a predetermined threshold saliency value, if placement engine 306 determines the saliency value of the same region in the second video frame is equal to or above the predetermined threshold saliency value.

In some examples, content placement system 302 may insert place or position one or more portions of a secondary content item (e.g., one or more video frames or images of the secondary content item) within a region of interest in a display of a display device depicting the primary content item or a different display device. In such examples, media system(s) 104 may include multiple displays, including display device 108. Moreover, media system(s) 104 may provide device data of each of the multiple displays or display devices included in media system(s) 104 to content placement system 302. Based on the device data, placement engine 306 may determine or detect each display or display device, such as display device 108, included in media system 104. Further, placement engine 306 may determine or select a particular display device of the detected display devices to display the primary content item (e.g., primary content 310A). Based on determining which display device is to display or is displaying the primary content item, placement engine 306 may select another different display or display device, such as display device 108, to display the secondary content item.

Figure 3C:
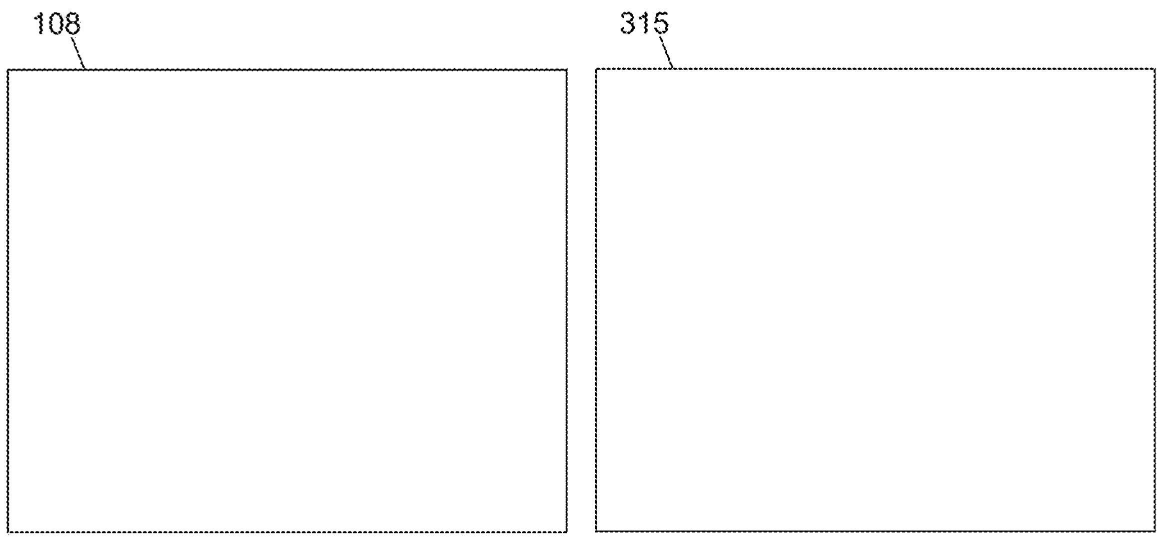

For example, and referring to FIG. 3C, based on device data of display or display device 108 and 315, placement engine 306 may determine or detect display device 315 and display device 108 is included in media system(s) 104. Moreover, placement engine 306 may determine or select detected display device 315 to display primary content 310A or determine display device 315 is playing or displaying primary content 310A. Based on determining to display primary content 310A on display device 315 or display device 315 is displaying primary content 310A, placement engine 306 may determine or select display device 108 to display secondary content 310B.

In another example, and referring to FIG. 3C, based on device data of display or display device 108 and 315, placement engine 306 may determine or detect display device 108 and display device 315 is included in media system(s) 104. Moreover, placement engine 306 may determine or select detected display device 108 to display primary content 310A or determine display device 108 is playing or displaying primary content 310A. Based on determining to display primary content 310A on display device 108 or display device 108 is displaying primary content 310A, placement engine 306 may determine or select display device 315 to display secondary content 310B.

In some cases, content placement system 302 may place or insert one or more video frames or images of a secondary content item, such as secondary content 310B, on one or more regions of interest determined for each of one or more video frames of a primary content item a user has selected, based on account information or data of the user. As described herein, the account information or data may include preference information indicating whether the user has given permission for content placement system 302 to insert or place one or more portions of the secondary content item (e.g., one or more video frames or images of the secondary content item) on the determined regions of interest of video frames of any primary content item a user selects. In such cases, account information or data of the user may be stored in one or more additional computing systems or servers of multimedia environment 102. Moreover, content placement system 302 may obtain the account information or data of the user from the additional computing systems or servers of multimedia environment 102.

Figure 3D:
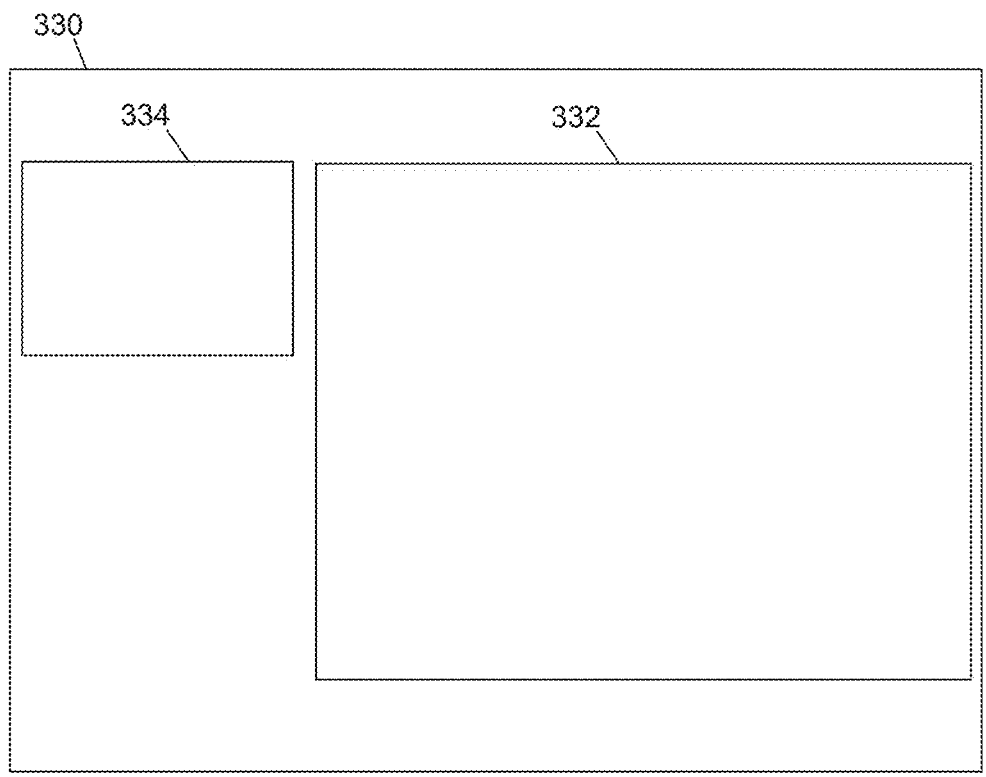

In some instances, the account information or data may indicate content placement system 302 may insert or place one or more portions of secondary content item, such as secondary content 310B, outside of the video frames of the primary content item, such as primary content 310A. In such instances, content placement system 302 may resize the video frames of the primary content item to create room on the display, such as display device 108, for the secondary content item. For instance, the account information or data may indicate content placement system 302 may insert or place one or more portions of secondary content 310B outside of primary content 310A and on the left of the primary content 310A. In such an instance, content placement system 302 may resize the video frames of primary content 310A as well as the video frames of secondary content 310B so that a right side of a display, such as display device 108, may present the video frames of primary content 310A while a left side of the display may present the video frames of secondary content 310B. For example, as illustrated in FIG. 3D, display device 108 may present or display on display 330 of display device 108 primary a video frame of primary content 310A, such as video frame 332, and a video frame or image of secondary content 310B, such as video frame 334, to the left of the video frame of primary content 310A.

Figure 3E:
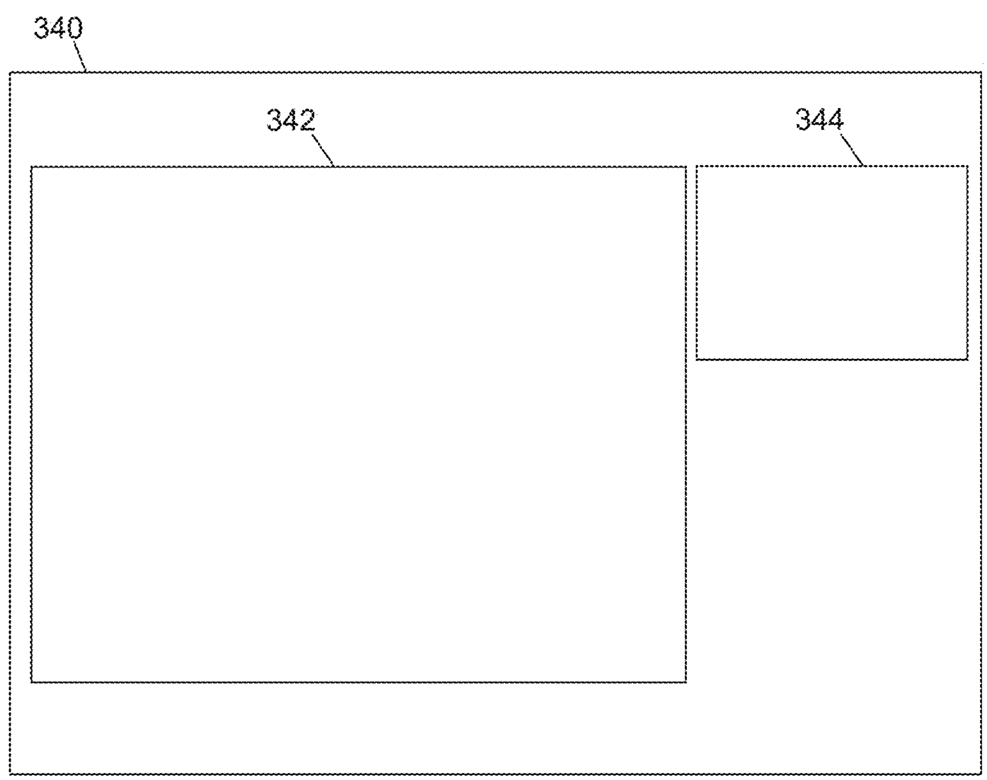

Referring back to FIG. 3A, and in another instance, the account information or data may indicate content placement system 302 may insert or place one or more portions of secondary content 310B outside of primary content 310A and on the right of the primary content 310A. In such an instance, content placement system 302 may resize the video frames of primary content 310A as well as the video frames of secondary content 310B so that a left side of a display, such as display device 108, may present the video frames of primary content 310A while a right side of the display may present the video frames of secondary content 310B. For example, as illustrated in FIG. 3E, display device 108 may present or display on display 340 of display device 108 primary a video frame of primary content 310A, such as video frame 342, and a video frame or image of secondary content 310B, such as video frame 344, to the right of the video frame of primary content 310A.

Figure 3F:
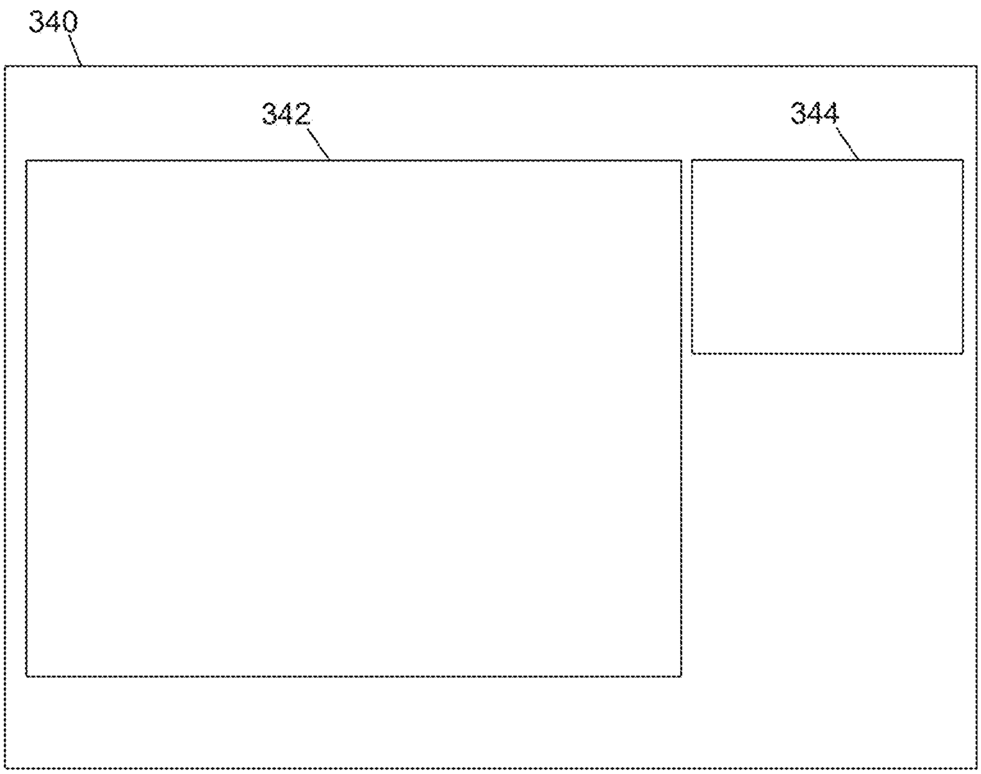

In another instance, the account information or data may indicate content placement system 302 may insert or place one or more portions of secondary content 310B outside of primary content 310A on top of the primary content 310A. In such an instance, content placement system 302 may resize the video frames of primary content 310A as well as the video frames of secondary content 310B so that a display, such as display device 108, may present the video frames of secondary content 310B on top of video frames of primary content 310A. For example, as illustrated in FIG. 3F, display device 108 may present or display on display device 315 of display device 108 primary a video frame of primary content 310A, such as video frame 352, and a video frame or image of secondary content 310B, such as video frame 354, on top of the video frame of primary content 310A.

Figure 3G:
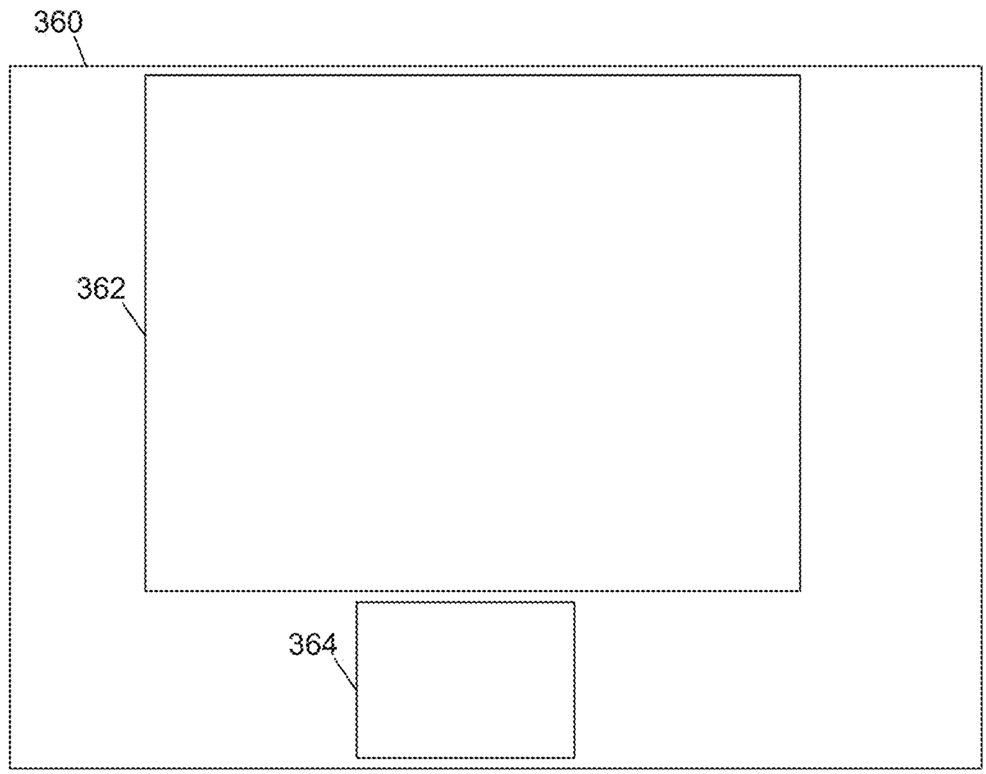

In another instance, the account information or data may indicate content placement system 302 may insert or place one or more portions of secondary content 310B under primary content 310A. In such an instance, content placement system 302 may resize the video frames of primary content 310A as well as the video frames of secondary content 310B so that a display, such as display device 108, may present the video frames of secondary content 310B under the video frames of primary content 310A. For example, as illustrated in FIG. 3G, display device 108 may present or display on display 360 of display device 108 primary a video frame of primary content 310A, such as video frame 362, and a video frame or image of secondary content 310B, such as video frame 364, underneath the video frame of primary content 310A.

Referring back to FIG. 3A, and in some cases, placement engine 306 may take into account the color(s) or pattern of color(s) of each region or portion identified in saliency map 308 with respect to the color(s) or pattern of color(s) of the secondary content item to be placed in a corresponding video frame of the primary content item. In such cases, content engine 304 may determine, for each region or portion identified in saliency map 308 of each video frame of the primary content item, a color or pattern of colors within each of the plurality of regions/portions, based on the corresponding video frame of the primary content item. Moreover, content engine 304 may generate saliency map 308 of each video frame that identifies, for each region or portion identified in saliency map 308, the color(s) or pattern of color(s) within the corresponding region or portion.

For instance, placement engine 306 may determine, for a video frame of a secondary content item, such as secondary content 310B, a region or portion of a video frame of a primary content item, such as primary content 310A, is a region of interest (e.g., a region that placement engine 306 may place or insert the video frame of the secondary content item on). Moreover, placement engine 306 may compare the color(s) or pattern of color(s) of the video frame of the secondary content item to the color(s) or pattern(s) of one or more regions or portions the video frame of the primary content item surrounding the region the region of interest of the video frame of the primary content item based on the corresponding saliency map 308. Based on the comparison, placement engine 306 may determine a contrast value indicating a level of color contrast between the color(s) or pattern of color(s) within the video frame of the secondary content item and the color(s) or pattern of color(s) within the surrounding regions or portions of the video frame of the primary content item. Further, placement engine 306 may determine whether the contrast value is greater than or equal to a predetermined threshold contrast value.

In instances where the contrast value is greater than or equal to a predetermined threshold contrast value, placement engine 306 may determine that the level of color contrast in the surrounding regions or portions of the video frame of the primary content item (e.g., primary content 310A) is great enough to view the video frame of the secondary content item (e.g., secondary content 310B). Based on such determination, placement engine 306 may insert or place the video frame of the secondary content item on the region or portion of the video frame of the primary content item determined to be the region of interest. In instances where the contrast value is less than the predetermined threshold contrast value, placement engine 306 may determine that the level of color contrast in the surrounding regions or portions of the video frame of the primary content item is not great enough to view the video frame of the secondary content item. Based on such determination, placement engine 306 may perform any of the example processes described herein to identify another region or portion of the video frame of the primary content item that may be a region of interest based on the corresponding saliency map 308 (e.g., another region or portion of the video frame that has a saliency value below a predetermined threshold saliency value).

In some aspects, placement engine 306 may perform any of the example processes described herein to determine when to display the secondary content item (e.g., secondary content 310B) while the primary content item (e.g., primary content 310A) is being displayed by, for example, display device 108. In such aspects, placement engine 306 may determine, for the first video frame of the secondary content item (e.g., the video frame with the earliest timestamp), a particular video frame of the primary content item to insert or place on. In some instances, placement engine may insert or place the second content item on the primary content item at predetermined time intervals.

For instance, placement engine 306 may obtain primary content 310A along with timestamp data indicating a timestamp associated with each video frame of primary content 310A. Based on the predetermined time interval, such as every 15 minutes, placement engine 306 may determine one or more video frames of primary content 310A that coincide with the predetermined time interval (e.g., video frame with a timestamp of 15 minutes, video frame with a timestamp of 30 minutes, etc.). Moreover, based on saliency map 308 of each of the determine video frame that coincide with the predetermined time interval, placement engine 306 may perform any of the example processes described herein to determine one or more regions of interest for the determined video frames of primary content 310A. Further, placement engine 306 may perform any of the example processes described herein to place at least the first video frame of secondary content 310B on the regions of interest of the one or more video frames of primary content 310A that coincide with the predetermined time interval (e.g., placement engine 306 may place the first video frame of the secondary content item on a region of interest of a video frame of the primary content item with a timestamp of 15 minutes).

In some instances, placement engine 306 may determine when to display the secondary content item (e.g., secondary content 310B) on the primary content item (e.g., primary content 310A) based on the audio data and/or audio related text data of the primary content item. In such instances, placement engine 306 may identify one or more instances during the primary content item where there is no dialogue or minimal dialogue. Moreover, placement engine 306 may insert or place the secondary content item on video frames of the primary content item with minimal or no dialogue.

For instance, for primary content 310A, placement engine 306 may obtain video data including video frames or images of primary content 310A, and audio data and/or audio-related data of primary content 310A. Based on the video frames or images of primary content 310A, and audio data and/or audio-related data of primary content 310A, placement engine 306 may determine one or more video frames of primary content 310A that includes minimal or no dialogue. Based on such determinations, placement engine 306 may obtain corresponding saliency map 308 of each of the one or more video frames of primary content 310A that has little or no dialogue. Moreover, based on saliency map 308 of each of the video frames that have little or no dialogue, placement engine 306 may perform any of the example processes described herein to determine one or more regions of interest for each of the video frames of primary content 310A that have little or no dialogue. Further, placement engine 306 may perform any of the example processes described herein to place at least the first video frame of secondary content 310B on the regions of interest for video frames of primary content 310A that have little or no dialogue.

In some cases, the primary content item, such as primary content 310A, may be prerecorded (e.g., prerecorded movies, television shows, documentaries, podcasts, etc.). In such cases, content placement system 302 may perform any of the example processes described herein to determine the regions of interest of one or more video frames or images of each of the prerecorded primary content items. Moreover, content placement system 302 may perform any of the example processes described herein to update the prerecorded primary content items (e.g., updated primary content 310C) by inserting or placing one or more portions of video data (e.g., one or more video frames or images) of secondary content items, such as secondary content 310B, on the determined regions of interest of the one or more video frames or images of each of the prerecorded primary content items. Further, content placement system 302 may provide the updated prerecorded primary content items to content server 120 for storage. Users of multimedia environment 102, such as user 132, may access the updated prerecorded primary content items (e.g., display the primary content item with the inserted or placed secondary content item on a corresponding display device 108 via media device 106).

In some cases, the primary content item, such as primary content 310A, may be a livestream (e.g., a concert). In such cases, the computing systems of multimedia environment 102 may add a delay to the transmission or broadcasting of the livestream primary content item to users of the multimedia environment 102 so that content placement system 302 may process the livestream primary content. For instance, content placement system 302 may process one or more portions of the livestream primary content item (e.g., determining the regions of interest of one or more video frames or images of the livestream primary content, and updating the livestream primary content, such as updated primary content 310C, by inserting or placing one or more portions of video data of secondary content items, such as secondary content 310B, on the determined regions of interest of the one or more video frames or images of each of the livestream primary content items) at a time to minimize the delay. The users of the multimedia environment may be provided, by the computing systems of multimedia environment 102, the processed portions of the updated livestream primary content item.

In some aspects, content engine 304 may utilize attention data to determine regions of interest on one or more video frames of a primary content item (e.g., primary content 310A). As described herein attention data may indicate where a user may be looking, such as regions or portions of a screen or display, such as display device 108, a user may be looking are or may be subsequently looking at. In such aspects, content engine 304 may obtain (e.g., with user consent) one or more images 312 depicting a user (or a portion of the user such as a face or facial region), such as user 132 of multimedia environment 102, from one or more sensors of a computing device, such as display device 108, media device 106 or any other computing device (e.g., a smart phone, tablet, laptop, etc.). The one or more sensors may be an optical sensor that captures and generates one or more images 312 of the user while the primary content item is being displayed by the same computing device associated with the sensors or a different computing device. Moreover, content engine 304 may apply one or more AI/ML processes or models to image(s) 312 of the user. Based on the application of the AI/ML process or models to the images, content engine 304 may track the attention level of the user as the primary content item is being displayed, and make one or more attention metric determinations, such as but not limited to, whether the user is looking at the display (e.g., display device 108) the primary content item may be displayed on, and, if the user is looking at the display, regions or portions of the display the user may be looking at, and/or maybe looking at next. Further, content engine 304 may generate the attention data that includes the attention metric determinations and a timestamp associated with each attention metric determination. Based on the attention data, content engine 304 may determine time stamps of video frames of the primary content item that may be associated with timestamps of each attention metric determination. Based on the determined timestamps of video frames that may be associated with the timestamps of each attention metric determination, content engine 304 may determine for each video frame of the displayed primary content item, regions or portions of the corresponding video frame the user looked at.

In some instances, content engine 304 may incorporate the attention metric determinations of the attention data into saliency map 308. In such instances, saliency map 308 may further identify, for each video frame of the primary content item (e.g., primary content 310A), portions or regions a user looked at or may potentially look at. Such regions or portions may be regions of interest that placement engine 306 may insert or place one or more portions of a secondary content item on, such as one or more video frames or images of secondary content item 301. Moreover, placement engine 306 may use saliency map 308 to determine where to insert or place one or more portions of secondary content item on (e.g., one or more video frames or images), such as secondary content 310B. Alternatively, content engine 304 may generate additional map data that identifies, for each video frame of the primary content item, regions or portions of the corresponding video frame the user looked at. Such regions or portions may be regions of interest that placement engine 306 may insert or place one or more portions of a secondary content item on, such as one or more video frames or images of secondary content item 301.

In some cases, the computing device may capture (e.g., with user consent) the images of the user (or a portion of the user) and/or the content engine 304 may track the attention level of the user. For example, the content engine 304 may determine where the user may be looking at and/or maybe looking at next, based upon the user consenting to such activities. In such instances, the user may indicate in their account information or data whether the user consents to such activities. Moreover, the computing device and/or content engine 304 may access the account information or data of the user to determine whether the user consents to such activities.

In some instances, content placement system 302 may use the attention data to identify regions of interest for other users. For instance, in a preselected focus group of individuals that consented to participating in the focus group, content engine 304 may determine/obtain attention data of each of the individuals for a particular primary content 310A. Based on the attention data, content engine 304 may identify one or more regions of interest of one or more video frames of primary content 310A. In some instances, the one or more regions of interest may be regions of or portions of the video frames that the majority of participants look at or on average looked at. Moreover, placement engine 306 may perform any of the example processes described herein to place or insert one or more video frames or images of secondary content 310B on the regions of interest of the video frames of primary content 310A. In another example, content placement system 302 may track a user attention level and/or content interaction from a user or a group of users presented with certain content, and use the tracked user attention level and/or content interaction to identify one or more regions of interest.

In some instances, content placement system 302 may utilize attention data to adjust the bit rate for one or more regions or portions of video frames of a primary content item (e.g., primary content 310A) being displayed on a computing device, such as display device 108, as the user is viewing the primary content item. As previously described, the attention data may indicate whether the user is looking at the display (e.g., display device 108) the primary content item may be displayed on, and, if the user is looking at the display, regions or portions of the display the user may be looking at, and/or maybe looking at next. Moreover, while the user is viewing the primary content item on the computing device, content placement system 302 may determine regions or portions of each video frame the user is looking at and/or not looking at based on the attention data. Further, content placement system 302 may instruct or cause the computing device, such as display device 108, to adjust the bit rate of the regions or portions of each video frame the user is looking at and/or regions or portions of each video frame the user is not looking at. For instance, content placement system 302 may cause the computing device, such as display device 108, to lower the bit rate for regions or portions of each video frame the user is not looking at. Consequently, the computing processing requirements to display the regions or portions of each video frame the user is not looking at in a lower bit rate may be reduced. Additionally, or alternatively, content placement system 302 may cause the computing device, such as display device 108, to increase the bit rate for regions or portions of each video frame the user is looking at.

Example Processes for Determining Whether to Output the Audio or Audio-Related Text Data of a Secondary Content Item In some aspects, while a computing device operated by a user of multimedia environment 102, such as display device 108 of user 132, displays a primary content item (e.g., primary content 310A) with the inserted or placed secondary content item (e.g., secondary content 310B), the audio of the primary content item and the audio of the secondary content item may conflict (e.g., overlap and make it difficult for the user to decipher which audio goes to which content). Referring to FIG. 3G, and in some cases, content placement system 302 may include audio engine 372. As described herein, audio engine 372 may determine whether to cause a computing device operated by a user of multimedia environment 102, such as display device 108 of user 132, to output the audio or audio-related text (e.g., closed captioning, subtitles, etc.) of the secondary content item, while the computing device is displaying or playing a primary content item that the secondary content item was inserted or placed into.

In some instances, audio engine 350 may include or represent one or more software models and/or algorithms. For example, audio engine 372 may include or represent one or more artificial intelligence (AI) or machine learning (ML) processes, algorithms or models. In some aspects, audio engine 372 may additionally or alternatively include or represent one or more other types of models/algorithms such as, for example, one or more heuristic algorithms.

In some cases, audio engine 372 may determine whether to cause the computing device to output the audio or audio-related text (e.g., closed captioning, subtitles, etc.) of the secondary content item (e.g., secondary content 310B) based on whether the primary content item (e.g., primary content 310A) is or will be outputting the audio or audio related text of the primary content item (e.g., closed captioning, subtitles, etc.). In such cases, a user of multimedia environment 102, such as user 132, may select a particular primary content item to display or play by media device 106 and/or display device 108. Moreover, as described herein, media device 106 and/or display device 108 may receive a corresponding updated primary content item (e.g., primary content 310C) and may display or play the selected primary content item with the inserted or placed secondary content item based on the updated primary content item. Further, audio engine 372 may obtain, from media system 104, such as media device 106 and/or display device 108 operated by the user), data 374 indicating whether the audio or audio-related text data of the selected primary content item is being or will be outputted while the selected primary content item with the inserted or placed secondary content item is being or will be displayed or played the computing device. Based on data 374, audio engine 372 may determine whether to cause the computing device to output the audio or audio-related text (e.g., closed captioning, subtitles, etc.) of the secondary content item.

For instance, data 374 may indicate the audio of the selected primary content item is also being outputted while the selected primary content item with the inserted or placed secondary content item is being displayed or played by the computing device. In such an instance, audio engine 372 may determine to cause the computing device to output the audio-related text (e.g., closed captioning, subtitles, etc.) of the secondary content item. Further, audio engine 372 may communicate with or provide an instruction, such as data 376, to the computing device to output the audio-related text of the secondary content item. In another instance, data 374 may indicate the audio-relate text (e.g., closed captioning) of the selected primary content item is also being outputted while the selected primary content item with the inserted or placed secondary content item is being displayed or played by the computing device. In such an instance, audio engine 372 may determine to cause the computing device to output the audio of the secondary content item. Further, audio engine 372 may communicate with or provide an instruction, such as data 376, to the computing device to output the audio of the secondary content item.

In another instance, as previously described herein, the selected primary content item may be displayed on one display device, such as display device 108, while the secondary content item is displayed on another display device (e.g., display device 315 of FIG. 3C). In such an instance, data 374 may indicate the audio or audio-related text of the primary content item is being outputted by the display device displaying the primary content item. Further, audio engine 372 may determine to cause the display device displaying the secondary content item to output the audio-related text of the secondary content item or the display device or the display device of the primary content item to output the audio-related text of the secondary content item (e.g., by communicating or providing and instruction, such as data 376). In instances where data 374 indicates the audio-related text of the primary content item is being outputted by the display device displaying the primary content item and audio engine 372 determines to cause the display device of the primary content item to display the audio-related text of the secondary content item, audio engine 372 may determine to cause the display device displaying the primary content item to also output the audio-related text of the secondary content item (e.g., by communicating or providing and instruction, such as data 376). In some instances, the audio-related text data of the secondary content item may be displayed underneath the audio-related text of the primary content item.

In some instances, while or prior to the selected primary content item (e.g., primary content 310A) with the inserted or placed secondary content item (e.g., secondary content 310B) is being displayed or played the computing device, audio engine 372 may receive data 374 indicating whether the audio or audio-related text data of the selected primary content item is also being outputted. In such instances, data 374 may be a user provided input received from a device, such as media device 106, display device 108, and/or another device (e.g., remote 110). For instance, while or prior to the selected primary content 310A with the inserted or placed secondary content 310B is being displayed or played display device 108, a user may provide an input to remote control 110. The input may indicate whether the audio or audio-related text of the selected primary content item should be outputted by the computing device. Further, remote control may generate data 374 indicating whether the audio or audio-related text of the selected primary content item should be outputted by the computing device based on the provided input. The remote control may provide the data to audio engine 372 via media device 106. Audio engine 372 may perform any of the example processes described herein to determine whether to cause display device 108 to output the audio or audio-related text of secondary content 310B based on data 374.

In some instances, account information or data of a user of multimedia environment 102 may include data 374 indicating whether the audio or audio-related text data of any selected primary content item (e.g., primary content 310A) is to be outputted. In such instances, audio engine 372 may receive the account information or data of the user including data 374 indicating whether the audio or audio-related text data of any selected primary content item is to be outputted based on the user selecting any primary content item to be displayed or played by media device 106 and/or display device 108. Based on the account information or data of the user, audio engine 372 may determine whether to cause the computing device to output the audio or audio-related text (e.g., closed captioning, subtitles, etc.) of the secondary content item (e.g., secondary content 310B) inserted or placed in one or more video frames or images of the primary content item.

In some instances, a computing device (e.g., display device 108) may output the audio-related text of a selected primary content item (e.g., primary content 310A), audio engine 372 may determine to cause the computing device to output audio-related text of the secondary content item (e.g., secondary content 310B). In such instances, audio engine 372 may determine a region or portion of one or more video frames of the selected primary content item to place or insert the audio-related text of the secondary content item. For instance, audio engine 372 may receive data 374 (e.g., data 374 included in account information or data of a user) associated with updated primary content 310C that is to be displayed or is displaying on display device 108. Moreover, audio engine 372 may receive audio-related text data of secondary content 310B and audio-related text data of the updated primary content 310C (or corresponding primary content 310A). In some instances, secondary content 310B is the secondary content item that is placed, inserted or positioned in the primary content item of updated primary content 310C. Based on data 374, audio engine 372 may determine the audio-related text of updated primary content 310C is to be outputted by display device 108. Based on such determination, the audio-related text data of secondary content 310B and the audio-related text data of the updated primary content 310C (or corresponding primary content 310A), audio engine 372 may determine a region or portion of one or more video frames of the primary content item of updated primary content 310C to place or insert the audio-related text of secondary content 310B.

In some aspects, audio engine 372 may perform any of the example processes as described herein with content engine 304 to determine one or more regions of interest of each video frame of the primary content item of updated primary content item (e.g., updated primary content 310C) to insert or place the audio-related text of the secondary content item (e.g., secondary content 310B). Moreover, audio engine 372 may obtain the audio related text data of the secondary content item from content server(s) 120 and insert or place the audio related text on the one or more regions of interest. In some aspects, audio engine 372 may place the audio-related text of the secondary content item within a predetermined distance threshold from the audio-related text of the selected primary content item, such as below and within a predetermined distance threshold distance from the audio-related text of the selected primary content item.

In cases where the audio-related text of a secondary content item (e.g., secondary content 310B) that is to be placed or inserted on one or more video frames of a primary content item (e.g., primary content 310A), audio engine 372 may cause a second computing device, separate from a computing device (e.g., display device 108) displaying the primary content item, to display the audio-related text of the secondary content item. Examples of a second computing device may include, but is not limited to, a smartphone, laptop, tablet, screen bar, display monitor, and television. For instance, based on updated primary content 310C, a first computing device, such as display device 108, may display or play a corresponding primary content 310A and one or more video frames or images of secondary content 310B placed or inserted on one or more video frames of the primary content 310A. Moreover, the first computing system may output the audio or audio related text of primary content 310A. Further, a second computing device, such as a screen bar, may output the audio-related text of second content 310B.

Figure 4:
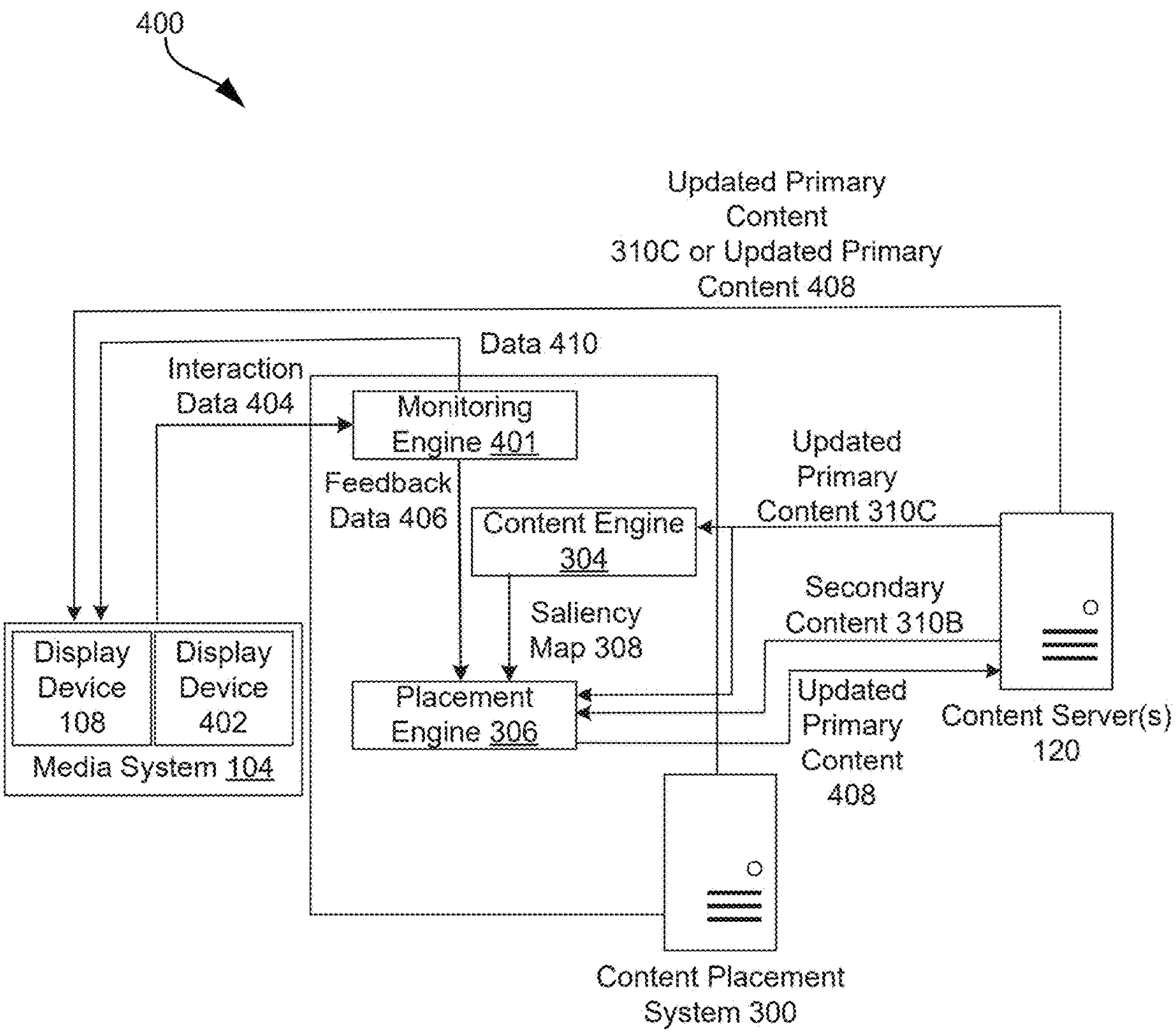
FIG. 4 illustrates an example system process for monitoring interactions between a user and one or more computing devices displaying, playing and/or outputting the primary content item and/or secondary content item.

Example Processes for Monitoring Interactions Between a User and One or More Computing Devices Displaying, Playing and/or Outputting the Primary Content Item and/or Secondary Content Item FIG. 4 illustrates an example system process 400 for monitoring interactions between a user (e.g., user 132) and one or more computing devices of media system 104, displaying, playing or outputting the primary content item (e.g., primary content 310A) and/or the secondary content item (e.g., secondary content 310B). In some instances, the one or more computing devices may include display device 108 and corresponding media device 106. In some instances, the one or more computing devices may include another display device. In some aspects, the other display device may communicate with another media device. In some cases, the other display device may communicate with media device 106.

As illustrated, content placement system 302 may include monitoring engine 401 to monitor the interactions between the user and the secondary content item (e.g., one or more video frames or images of the secondary content item) and/or the primary content item (e.g., one or more video frames or images of the primary content item). In some instances, monitoring engine 401 may include or represent one or more software models and/or algorithms. For example, monitoring engine 401 may include or represent one or more artificial intelligence (AI) or machine learning (ML) processes, algorithms or models, including any of the example AI/ML models previously described. In some cases, monitoring engine 401 may additionally or alternatively include or represent one or more other types of models/algorithms such as, for example, one or more heuristic algorithms.

In some examples, monitoring engine 401 may obtain, from the one or more computing devices of media system 104, interaction data 404 indicating or characterizing one or more interactions between the user and the secondary content item and/or the primary content item (e.g., one or more video frames or images of the primary content item), such as any interactions of the user with the secondary content item (e.g., inputs associated with the secondary content item), an attention (e.g., focus, engagement, user interaction, etc.) of the user relative to the primary content item and/or the secondary content item, etc. In some instances, interaction data 404 may include timestamps or data indicating a time and/or data of each identified and characterized interaction. Moreover, monitoring engine 401 may monitor the interactions between the user and the secondary content item and/or primary content item based on interaction data 404. Examples of interactions identified or characterized by interaction data 404 include, but are not limited to, user inputs, user feedback, user replies to prompts and/or events, user gestures, and attention related data. Moreover, monitoring engine 401 may monitor interactions between the user and the secondary content item and/or primary content item to determine feedback information related to the placement or insertion of one or more videoframes or images of a secondary content item on one or more regions of interest of one or more video frames or images of a primary content item. As described herein, the feedback information may indicate a reaction of the user with respect to the placement or insertion of the one or more video frames or images of the secondary content item on one or more regions of interest of one or more video frames or images of a primary content item, such as whether the placement or insertion of the videoframes or images of the secondary content item on the one or more regions of interest of the one or more video frames or images of primary content item was appropriate, inappropriate, desirable, undesirable or inappropriate. Further, monitoring engine 401 may generate feedback data 406 including the feedback information. In some instances, monitoring engine 401 may provide feedback data 406 to placement engine 306. Based on feedback data 406, placement engine 306 may update updated primary content item (e.g., updated primary content 408) by adjusting the placement or insertion of the videoframes or images of the secondary content item (e.g., to another region of interest in a corresponding video frame of the primary content item).

Placement engine 306 may adjust the positioning of one or more video frames of the secondary content item (e.g., secondary content 310B) from video frame to video frame of the primary content item (e.g., primary content 310A) or may place the one or more video frames of the secondary content item within a same or static position within multiple video frames of the primary content item. For instance, and following the example above, placement engine 306 may place a first video frame of secondary content 310B in a region of the first video frame of primary content 310A if the region has a saliency value below a predetermined saliency value threshold. Moreover, placement engine 306 may place a second video frame of the secondary content 310B in another region of a second video frame of primary content 310A with a saliency value that is below a predetermined threshold saliency value, if placement engine 306 determines the saliency value of the same region in the second video frame as the region in the first video frame of primary content 310A is equal to or above the predetermined threshold saliency value or is higher than the saliency value of the other region of the second video frame of the primary content 310A.

In some instances, feedback data 406 may indicate the placement or insertion of a video frame or image of the secondary content item (e.g., secondary content 310B) on a video frame of the primary content item (e.g., primary content 310A) was undesirable for the user. In such instances, placement engine 306 may adjust the positioning of the video frame of the secondary content item on the video frame of the primary content item. Moreover, placement engine 306 may rewind to a video frame prior to the video frame that feedback data 406 indicated had an undesirable placement or insertion of the video frame or image of the secondary content item. For instance, placement engine 306 may obtain feedback data 406 indicating a placement or insertion of a video frame of secondary content 310B on a region of interest on a video frame of primary content 310A is undesirable. Based on the feedback data 406, placement engine 306 may perform any of the described example processes to adjust the positioning of the video frame of the secondary content 310B to another region of interest on the video frame of primary content 310A. Moreover, placement engine 306 may cause a computing device displaying primary content 310A with the adjusted video frame of secondary content 310B, to rewind to a video frame prior to the video frame indicated in feedback data 406 (e.g., placement engine 306 may transmit a corresponding instruction to display device 108 via media device 106). That way, upon playing primary content 310A with the inserted or placed portions of secondary content 310B, the computing device, may display the video frame indicated in feedback data 406 with the adjusted video frame of secondary content 310B.

In some cases, one or more computing devices (e.g., display device 108) may display or play a selected primary content item (e.g., primary content 310A) along with the placed or inserted secondary content item (e.g., secondary content 310B) based on, for example, corresponding updated primary content item (e.g., updated primary content 310C). Moreover, the computing devices may further display one or more interactive features that enables a user viewing the selected primary content item along with the placed or inserted secondary content item to provide an input, via media system 106 (e.g., media device 106), indicating whether the placement or insertion of one or more portions (e.g., one or more video frames or images) of the secondary content item was appropriate or inappropriate for the corresponding user (e.g., user 132) and/or otherwise providing feedback about the placement or insertion of the one or more portions of the secondary content item. Based on the user provided input, the computing devices may generate interaction data 404 indicating whether the placement or insertion of the one or more portions of secondary content item was appropriate or inappropriate and/or providing the feedback of the user and/or information about the feedback of the user. Further, the computing devices may provide or transmit interaction data 404 to monitoring engine 401. In some instances, interaction data 404 may include timestamps or data indicating a time and/or data of when the user provided such input and/or a particular video frame of the selected primary content item the input was provided or associated with. Based on interaction data 404, monitoring engine 401 may determine feedback information including, but not limited to, whether the user indicated the placement or insertion of the one or more portions of secondary content item was appropriate or in appropriate and/or any other feedback provided by the user, the number of times the user made such indication, and a time or video frame associated with each of the indications.

In some aspects, one or more computing devices (e.g., display device 108) may display or play a selected primary content item along (e.g., primary content 310A) with the placed or inserted secondary content item (e.g., secondary content 310B), based on, for example, corresponding updated primary content item (e.g., updated primary content 310C). Moreover, the computing devices (e.g., media device 106) may enable a user (e.g., user 132) to provide one or more inputs to adjust the positioning of one or more portions of the secondary content item (e.g., one or more video frames or images) on the selected primary content item, while the selected primary content item is being displayed or played by the one or more computing devices. Based on the user provided inputs, the computing devices (e.g., media device 106) may generate interaction data 404 of the user provided inputs, including the adjustments of the positioning of the one or more portions of the secondary content item on the selected primary content item, timestamps and/or a time or date of each adjustment, and/or a corresponding videoframe of each adjustment. Further, the computing devices (e.g., media device 106) may provide interaction data 404 to monitoring engine 106. Monitoring engine 106 may determine whether the placement or insertion of one or more portions (e.g., one or more video frames or images) of the secondary content item was appropriate or inappropriate based on interaction data 404.

For instance, for a particular video frame of the selected primary content 310A, monitoring engine 106 determines an adjustment of a position of a video frame of secondary content 310B occurred by user 132. Based on such determination, monitoring engine 106 may determine the initial placement or insertion of the video frame of secondary content 310B on the corresponding video frame of the selected primary content 310A is undesirable to user 132. Further, monitoring engine 106 may determine or generate feedback information indicating the initial placement or insertion of the video frame of secondary content 310B on the corresponding video frame of the selected primary content 310A is undesirable to user 132. In some instances, the feedback information may indicate the adjust position of the video frame of secondary content 310B. Alternatively, for a particular video frame of the selected primary content 310A, monitoring engine 106 may determine no adjustment of a position of a video frame of secondary content 310B occurred by user 132. Based on such determination, monitoring engine 106 may determine the initial placement or insertion of the video frame of the secondary content item on the corresponding video frame of the selected primary content item was desirable to user 132. Further, monitoring engine 106 may determine or generate feedback information indicating the initial placement or insertion of the video frame of secondary content 310B on the corresponding video frame of the selected primary content 310A is desirable to user 132. In some instances, the feedback information may indicate the initial placement or insertion of the video frame of secondary content 310B on the corresponding video frame of selected primary content 310A.

In some cases, content placement system 302 may use such adjustments to identify one or more regions of interest of one or more video frames of one or more primary content items. For instance, for a particular video frame of a particular primary content item, content engine 304 may receive feedback data 406 of various users of multimedia environment 102 (e.g., user 132). In such an instance, each feedback data 406 may indicate adjustments made by a corresponding user to the positioning of a videoframe of a secondary content item. Based on feedback data 406 of each of the various users, content engine 304 may determine one or more regions of interest for the particular video frame. Further, placement engine 306 may use the determined regions of interest for placing or inserting the video frame of the secondary content item. For instance, content engine 304 may determine, for the particular video frame, one or more regions of interest the various users adjusted to or selected based on feedback data 406. Moreover, content engine 304 may determine one or more regions of interest the majority of the various users adjusted to or selected for the particular video frame based on feedback data 406. Further, content 304 may determine use the one or more regions of interest the various users adjusted to or selected for the particular video frame.

In some aspects, a computing device, such as display device 108, may display or play a selected primary content item (e.g., primary content 310A) along with the placed or inserted secondary content item (e.g., secondary content 310B), based on, for example, corresponding updated primary content item (e.g., updated primary content 310C). Moreover, a second computing device, such as an additional display device associated with or connected to media system 104, may output (e.g., display) an audio-related text of the secondary content item. In such cases, monitoring engine 401 may monitor the interactions between a user (e.g., user 132) and additional display device 402 to prevent the user from fully ignoring the screen of additional display device 402.

In some instances, monitoring engine 401 may obtain, from the additional display device 402, interaction data 404 indicating or characterizing one or more interactions between the user and additional display device 402, such as, but not limited to, user inputs, user feedback, user replies to prompts and/or events, user gestures, and attention related data. Moreover, monitoring engine 401 may determine an engagement level between the user and additional display device 402 (e.g., content depicted in additional display device 402) based on interaction data 404. Further, in instances where the engagement level is below a predetermined engagement level threshold (e.g., the engagement value corresponding to the determined engagement level is below a value corresponding to the predetermined engagement level threshold), monitoring engine 401 may perform any of the described example processes to encourage the user to interact with or engage with additional display device 402. In some cases, monitoring engine 401 may monitoring engine 401 may perform any of the describe example processes to encourage the user to interact with or engage with additional display device 402 by adjusting one or more display attributes of the content (e.g., secondary content 310B) depicted in additional display device 402, such as the size, scale, aspect ratio, etc.

For instance, monitoring engine 401 may obtain, from additional display device 402, interaction data 404. Moreover, monitoring engine 401 may determine an engagement level between user 132 and secondary content 310B depicted in additional display device 402 based on interaction data 404. Based on such determinations, monitoring engine 401 may determine the engagement level is below a predetermined engagement level threshold (e.g., the engagement value corresponding to the determined engagement level is below a value corresponding to the predetermined engagement level threshold). Further, monitoring engine 401 may adjust one or more display attributes of secondary content 310B, such as the increasing the size of secondary content 310B, upscaling secondary content 310B, increasing the aspect ratio of secondary content 310B, etc., based on determining the engagement level is below a predetermined engagement level threshold.

In some cases, monitoring engine 401 may perform any of the describe example processes to encourage the user to interact with or engage with additional display device 402 by causing display device 108, via media device 106, to black out or obfuscate the primary content item (e.g., primary content 310A) including the placed or inserted video frames of the secondary content item (e.g., secondary content 310B) displayed or played by display device 108.

For instance, periodically or after some time threshold, content placement system 302 may cause the additional display device 402 to present a prompt that requests an input from a user (e.g., user 132) operating the additional display device 402. The user may respond to the prompt via, for example, media device 106 or another media device, or the user may not respond to the prompt. Either way, the additional display device 402 may, via media device 106 or another media device, generate and transmit interaction data 404 indicating the reply or lack thereof of the user. Based on interaction data 404, monitoring engine 401 may determine an engagement level between the user and the additional display device 402. For example, if the user replied to the prompt, monitoring engine 401 may determine the level of engagement of the user is higher than if the user ignored the prompt, and may determine an engagement value representing a determined level of engagement. Alternatively, if the user ignored the prompt within a predetermined time threshold after the prompt was displayed, monitoring engine 401 may determine the level of engagement of the user is lower than if the user had replied to the prompt, and may determine an engagement value representing a determined level of engagement. Further, monitoring engine 401 may compare the engagement value corresponding to the determined engagement level between the user and the additional display device 402 and a predetermined engagement level threshold. In instances where the engagement value of the engagement level is below a value corresponding to the predetermined engagement level threshold, monitoring engine 401 may cause or instruct (e.g., via data 410) display device 108, via media device 106, to black out or obfuscate primary content 310A including the placed or inserted secondary content 310B displayed or played by display device 108. The displayed or played primary content 310A including the placed or inserted secondary content 310B may be based on updated primary content 310C or updated primary content 408. Otherwise, display device 108 may continue displaying primary content 310A including the placed or inserted secondary content 310B.

In another instance, periodically or after some predetermined time interval, one or more sensors, such as image sensors, of the additional display device 402 may generate and transmit interaction data 404 including attention related data, such as one or more images of a user (or a portion of the user) operating the additional display device 402, to monitoring engine 401. In such an instance, monitoring engine 401 may apply one or more AI/ML processes or models to the attention related data, such as the images of the user. Based on the application of the AI/ML process or models to the images, monitoring engine 401 may track the attention level of the user, and determine whether the user is focused on or attentive to the additional display device 402. Moreover, monitoring engine 401 may determine an engagement level between the user and the additional display device 402 based on an attention level of the user with respect to the additional display device 402. In instances, if the user attention level indicates that the user is paying attention to (e.g., focused on, etc.) the additional display device 402, monitoring engine 401 may determine an engagement level of the user with additional display device 402 is higher than if the user was not paying attention to the additional display device 402, and may determine a corresponding engagement value. Alternatively, if the user attention level indicates that the user is not paying attention to the additional display device 402, monitoring engine 401 may determine an engagement level of the user with additional display device 402 is lower and may determine a corresponding engagement value. Further, monitoring engine 401 may compare the engagement value corresponding to the determined engagement level between the user and the additional display device 402 and a predetermined engagement level threshold. In instances where the engagement value of the engagement level is below a value corresponding to the predetermined engagement level threshold, monitoring engine 401 may cause or instruct (e.g., via data 410) display device 108, via media device 106, to black out or obfuscate primary content 310A including the placed or inserted one or more video frames of secondary content 310B displayed or played by display device 108. The displayed or played primary content 310A including the placed or inserted secondary content 310B may be based on updated primary content 310C or updated primary content 408. Otherwise, display device 108 may continue displaying the primary content item including the placed or inserted secondary content item.

In some cases, an image sensor (e.g., a camera of the additional display device 402 or a separate camera) may capture the images of the user (or a portion of the user) and monitoring engine 401 may track the user attention level based upon the user consenting to such activities. In such instances, the user may indicate in their account information or data whether the user consents to such activities. Moreover, the additional display device, via corresponding media device, and/or content engine 304 may access the account information or data of the user to determine whether the user consents to such activities.

Figure 5:
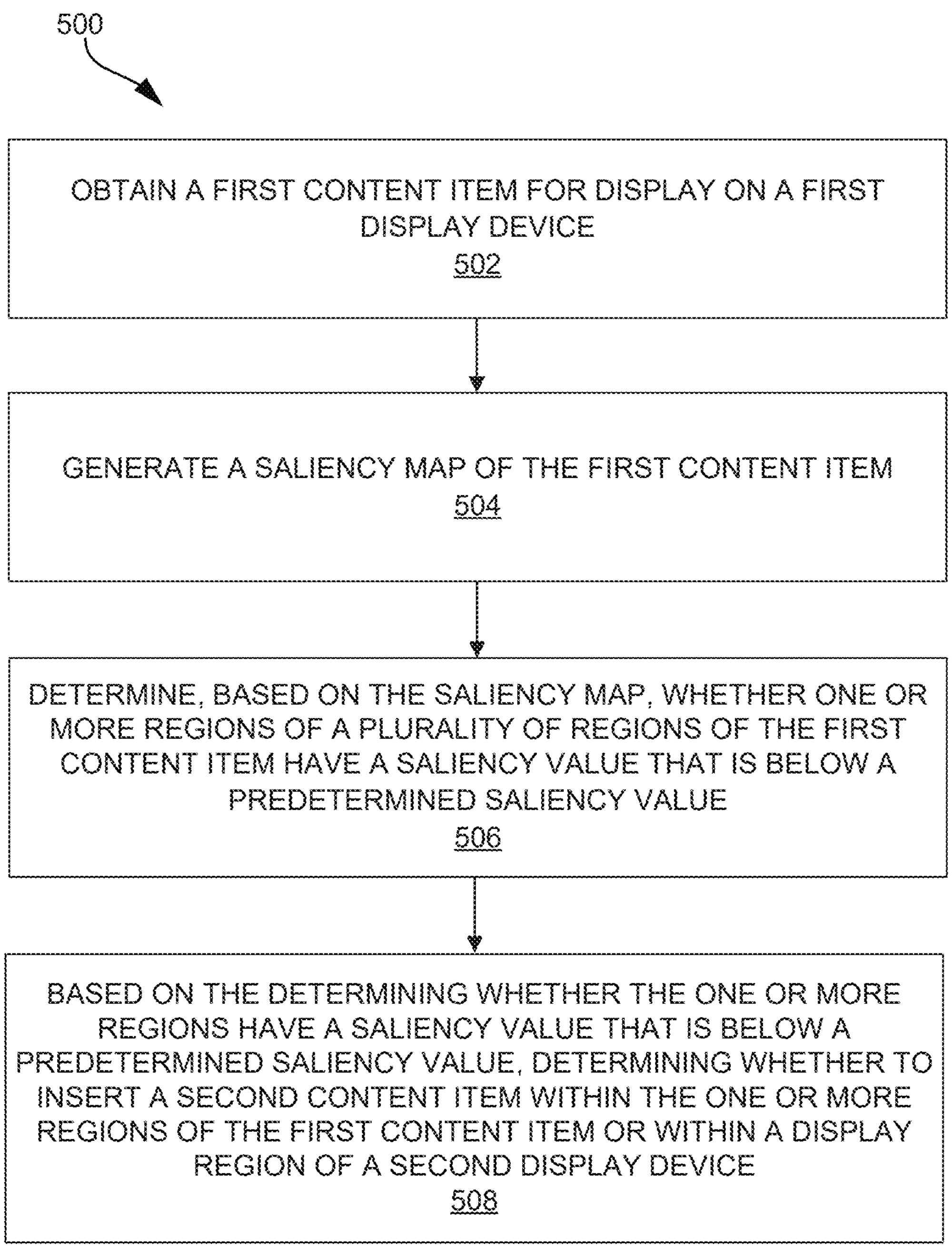
FIG. 5 illustrates a flow chart of an example process for inserting or placing one or more portions of a secondary content item onto one or more regions of interest of a display depicting a primary content item or a display region on a different display.

FIG. 5 is a flowchart for a method 500 for inserting or placing one or more portions of a secondary content item onto one or more regions of interest of a first display depicting a primary content item or a different display, according to some examples of the present disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in any figures of the disclosure, as will be understood by a person of ordinary skill in the art.

Method 500 shall be described with reference to FIG. 3A. However, method 500 is not limited to that example. At step 502, content placement system 302 may obtain a first content item (e.g., a primary content item) for display at a first display device. The first content item can include video data. In some examples, the first content item can include a sequence of images or video frames. In some cases, the first content item can further include audio data and/or text data (e.g., subtitles, closed-captioning, notifications, etc.). In some aspects, content placement system 302 may obtain the first content item and video data from content server(s) 120. In some examples, the first content item may be a primary content item (e.g., primary content 310A). In some cases, the first content item may be a content item a user of display device 108 and/or media devices 106 has selected for display at display device 108. As described herein, examples of primary content items may include, but are not limited to, movies, television shows, podcasts, videos, livestreams, media channels, extended reality content (e.g., virtual reality, augmented reality, mixed reality, virtual reality with video passthrough, etc.), video conferences, video games, and applications.

At step 504, content placement system 302 may generate, based on the video data associated with the first content item, a saliency map (e.g., saliency map 308) of the first content item. The saliency map can identify a plurality of regions of the first content item, and each region of the plurality of regions can be associated with a saliency value. As described herein, content engine 304 of content placement system 302 may generate the saliency map based on characteristics of the first content item (e.g., color, texture, luminance, shapes, objects, etc.), pixel values of the first content item, visual saliency of elements depicted in the first content item, features depicted in the first content item, elements depicted in the first content item, visual distinctiveness of elements and/or portions of the first content item, user inputs associated with the first content item, activity associated with the first content item, and/or analysis of the first content item. The saliency map may identify a plurality of regions of the first content item and a corresponding saliency value.

A saliency value may indicate, for example and without limitation, a value quantifying and/or estimating how much a corresponding portion/region of content stands out from surrounding regions or portions of content, how much human visual attention the portion/region is estimated/predicted to attract and/or a probability that the portion/region will attract human visual attention over other portions/regions of content, a measurement of visual features associated with the portion/region of content, a likelihood that a user will focus on that portion/region of content before other portions/regions of content (and/or a ranking indicating a user's predicted/estimated focus on the portion/region of content relative to other portions/regions of content), a measurement or representation of a user attention (e.g., focus, attention by a human visual system, etc.) that the portion/region of content is predicted/estimated to receive or attract (e.g., how much attention/focus, an order or priority of focus/attention relative to other portions/regions of content, etc.), a visual distinctiveness relative to other portions/regions of content, a visual stimulus, a prediction of a user attention level with respect to the portion/region of content, a predicted response/behavior of a human attention mechanism/system to the portion/region of content, whether the corresponding portion/region of content part of a background or foreground of the first content item, whether the corresponding portion/region depicts something relevant to one or more previous and/or subsequent portions of content of the first content item such as one or more previous and/or subsequent video frames (e.g., relevant to a plot, event, message, activity, etc.), an assessed importance or relevance of the corresponding portion/region relative to other portions/regions of the first content item, a measurement of visual attention, a prediction and/or estimate of a distinct perceptual quality of the portion/region of content, and/or any other characteristic, interpretation, and/or information conveyed by any saliency detection/determination algorithms recognized/understood by one of skill in the art based on the disclosure and the term saliency as understood by one of skill in the art.

In some cases, the saliency value can be determined based on one or more aspects of the first content item, such as pixel values, luminance values, texture values, semantic meaning of elements depicted in the first content item, objects depicted in the first content item, colors, visual patterns, visual shapes, visually distinctive elements and/or features depicted in the first content item, motion associated with content depicted in the first content item, a level of activity determined from one or more regions or portions of the first content item, one or more visual cues, =whether a region or portion of content of the first content item conveys information that is or is not relevant to understanding one or more details conveyed in one or more previous or subsequent portions of content (e.g., video frames), and/or content pattern characteristics.

At step 506, content placement system 302 may determine, based on the saliency map, whether one or more regions of the plurality of regions have a saliency value that is below a predetermined saliency threshold value. For example, placement engine 306 may obtain saliency map 308 for primary content 310A. Based on saliency map 308, placement engine 306 may determine a saliency value for each region or portion of content of primary content 310A. Placement engine 306 may determine whether any region or portion of content has a saliency value that is below a predetermined saliency value. As described herein, regions or portions of images that have saliency values that are higher than the predetermined saliency value may include content that may be determined to be of a certain estimated saliency and/or interest to users. Regions or portions of video frames that have saliency values that are lower than the predetermined saliency value may include content that may not be as interesting to the user.

At step 508, content placement system 302 may determine, based on the determining whether the one or more regions have a saliency value that is below a predetermined saliency value, whether to insert a second content item within the one or more regions of the first content item or within a display region of a second display device. As described herein, placement engine 306 of content placement system 302 may place or insert the second content item (e.g., secondary content 310B) within the one or more regions of the first content item or within a display region of a second display device. Moreover, as previously described, the second content item may be a content item (e.g., an advertisement) provided by a third-party content provider or otherwise associated with a third party. In some instances, the second content item may be a content item (e.g., a promotional content item) stored and/or generated by content server(s) 120 and/or another computing system included in multimedia environment 102. In some cases, the second content item may be a video (e.g., a commercial) or an image. In some cases, the second content item may include audio data (e.g., data associated with music, sounds and/or dialogue of the primary content item) and/or audio-related text data (e.g., closed captioning, subtitles, etc.).

In some aspects, the method 500 can further include obtaining device data of a computing device associated with a user; based on the device data, determining that the computing device is connected to multiple display devices; determining that the first display device of the multiple display devices is displaying the first content item; and based on a determination that the one or more regions of the plurality of regions do not have a saliency value that is, below the predetermined saliency value, determining to display the second content item on the second display device of the multiple display devices. In this example, the multiple display devices can include the first display device and the second display device.

In some aspects, the method 500 can include obtaining data about one or more user interactions with at least one of the first content item and the second content item; and determining whether to insert the second content item within the one or more regions of the first content item or within the display region of a second display device further based on the data about the one or more user interactions.

In some aspects, the method 500 can include obtaining data about one or more user interactions with at least one of the first content item and the second content item; and based on the data about the one or more user interactions, determining to move at least a portion of the second content item to different region of the first content item.

In some aspects, the method 500 can include determining attention data associated with the first content item. In some examples, the attention data can indicate a user attention level corresponding to the first content item and/or user engagement with the first content item. The method 500 can further include determining, based on the attention data, whether to insert the second content item within the one or more regions of the first content item or within the display region of a second display device.

In some aspects, the method 500 can include obtaining subtitle data of at least one of the first content item and the second content item; and displaying information included in the subtitle data on the second display device.

In some cases, determining whether to insert the second content item within the one or more regions of the first content item or within the display region of a second display device can include determining that the first content item is displayed via the first display device; and determining to display the second content item via the second display device based on the determining that the first content item is displayed via the first display device.

Figure 6:
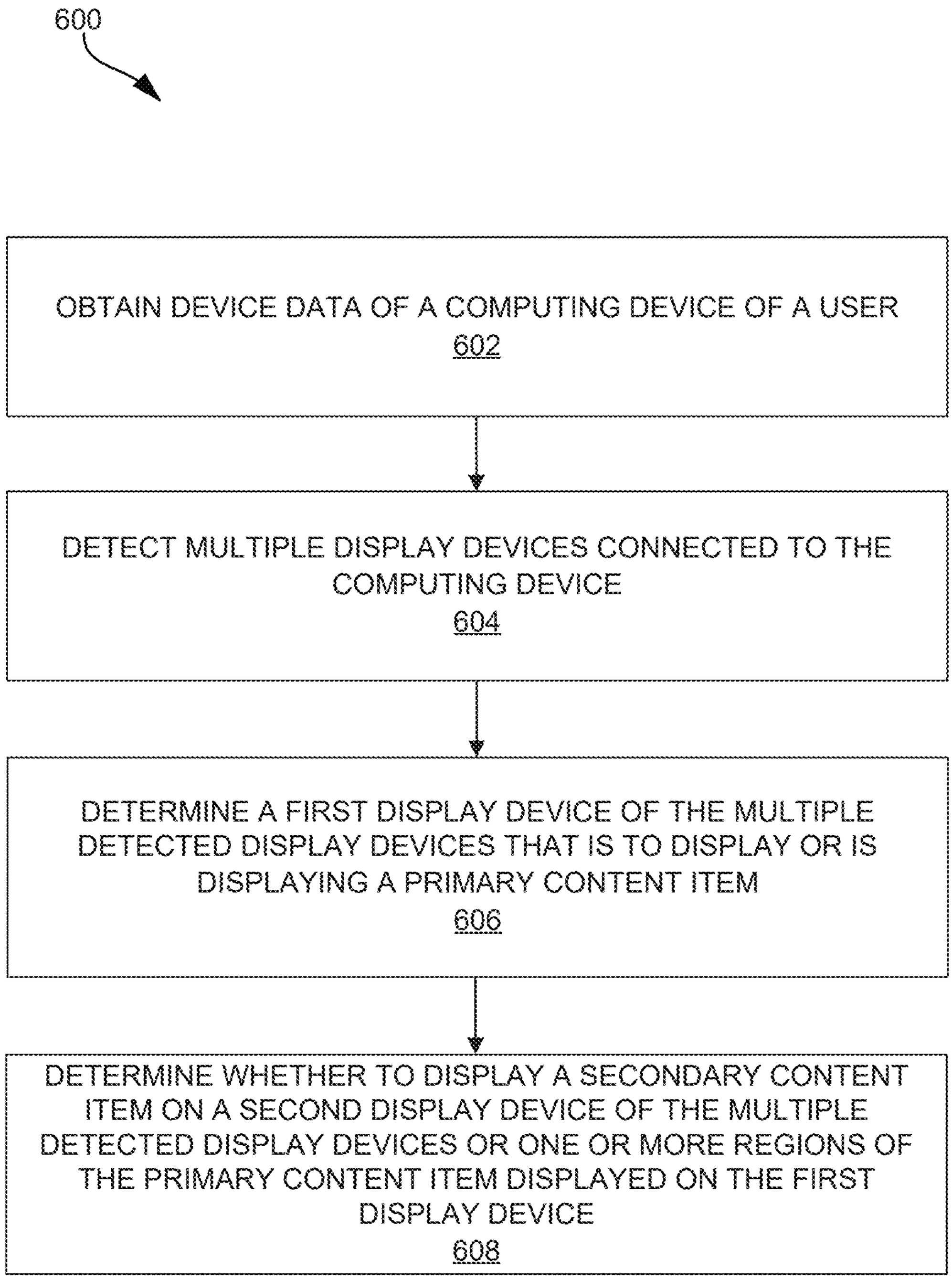
FIG. 6 illustrates a flow chart of an example process for inserting or placing one or more portions of a secondary content item (e.g., one or more video frames or images of the secondary content item) within a region of interest in a display of a first display device that is different from a second display device presenting or displaying a primary content item.

FIG. 6 is a flowchart for a method 600 for inserting or placing one or more portions of a secondary content item (e.g., one or more video frames or images of the secondary content item) within a region of interest in a display of a first display device that is different from a second display device presenting or displaying a primary content item, according to some examples of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3A and FIG. 3C, as will be understood by a person of ordinary skill in the art.

Method 600 shall be described with reference to FIG. 3A and FIG. 3C. However, method 600 is not limited to that example. At step 602, content placement system 302 may obtain device data of a computing device of a user. In some instances, the device data may include data identifying one or more display devices, such as display device 108, connected to the computing device. In some cases, the display device may be connected to the computing device via wires. In some cases, the display device may be connected to the computing device wirelessly via, for example, Bluetooth, WIFI, WIFI direct, etc. Moreover, the device data may include other information about the display devices, such as, but not limited to, resolution, size, which is set as the main/primary display device (if any), how they're configured (e.g., mirrored view, extended view, etc.), etc.

At step 604, content placement system 302 may detect multiple display devices connected (e.g., wirelessly or via wires) to a computing device associated with a user based on the device data. For example, placement engine 306 may determine or detect each display device (e.g., from multiple display devices), such as display device 108, included in media system 104, based on the device data.

At step 606, content placement system 302 may determine a first display device of the multiple detected display devices that is displaying or is to display a primary content item. For example, placement engine 306 may determine or select a first display device, such as display device 108 or display device 315, of the detected display devices to display primary content 310A.

At step 608, content placement system 302 may determine whether to display the secondary content item on a second display device of the multiple detected display devices or one or more regions of the primary content item displayed on the first display device. In some examples, the second display device may not be displaying any content. In such examples, content placement system 302 may cause the second display device of the multiple detected display devices to display the second content item. For example, placement engine 306 may obtain data from the computing device indicating primary content 310A is being displayed by a first display device of multiple detected display devices of the computing device, and no content is being displayed on the second display device of the multiple detected display devices. Moreover, placement engine 306 may provide instructions or data to the computing device to display second content 310B via the second display.

In some examples, content may be playing on the first display device of the multiple detected display devices of the computing device and the second display device of the multiple detected display devices. In such examples, content placement system 302 may determine which of one or more regions of interest of the content displayed on the first display device (if any) and one or more regions of interest of the content displayed on the second display device (if any) has lower saliency values. Based on which content has lower saliency values, content placement system 302 may place the second content item on the region of content with a lower saliency value. For example, placement engine 306 may obtain data, from the computing device, indicating the first display device of the multiple display devices of the computing device is displaying or is to display primary content 310A. Moreover, placement engine 306 may obtain data, from the computing device, indicating the second display device of the multiple display devices of the computing device is displaying or is to display another content item. Further, placement engine 306 may obtain, from content engine 304, one or more saliency maps for primary content 310A and one or more saliency maps for the other content item. As described herein, content engine 304 may perform any of the example processes as described herein to generate saliency maps for primary content 310A or any other content item of multimedia environment 102. Based on the saliency maps for primary content 310A and the saliency maps for the other content item, placement engine 306 may determine or identify one or more regions of interest (e.g., regions with a saliency value below a saliency value threshold). Based on the identified one or more regions of interest for primary content 310A and the other content, placement engine 306 may determine whether primary content 310A or the other content has region(s) of interest with the lowest saliency value. Placement engine 306 may insert or place one or more videoframes or images of secondary content 310B onto a corresponding video frame of a content (e.g., primary content 310A or the other content item) with a region(s) of interest with the lowest saliency value.

Figure 7:
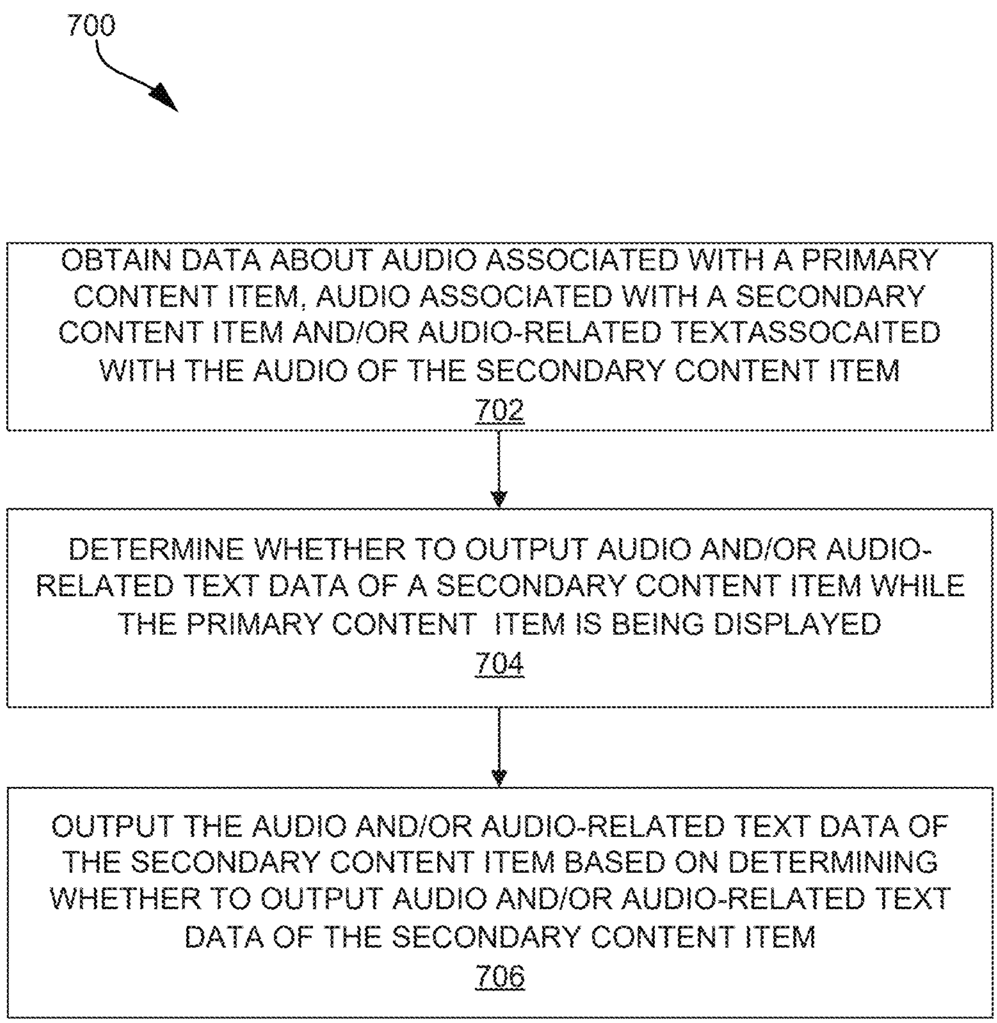
FIG. 7 illustrates a flow chart of an example process for determining whether to output audio data of a secondary content item and/or audio-related text data of the secondary content item, while the primary content item is displayed by a display device.

FIG. 7 is a flowchart for a method 700 for determining whether to output audio data of a secondary content item and/or audio-related text data of the secondary content item, while the primary content item is displayed by a display device, according to some examples of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3H, as will be understood by a person of ordinary skill in the art.

Figure 3H:
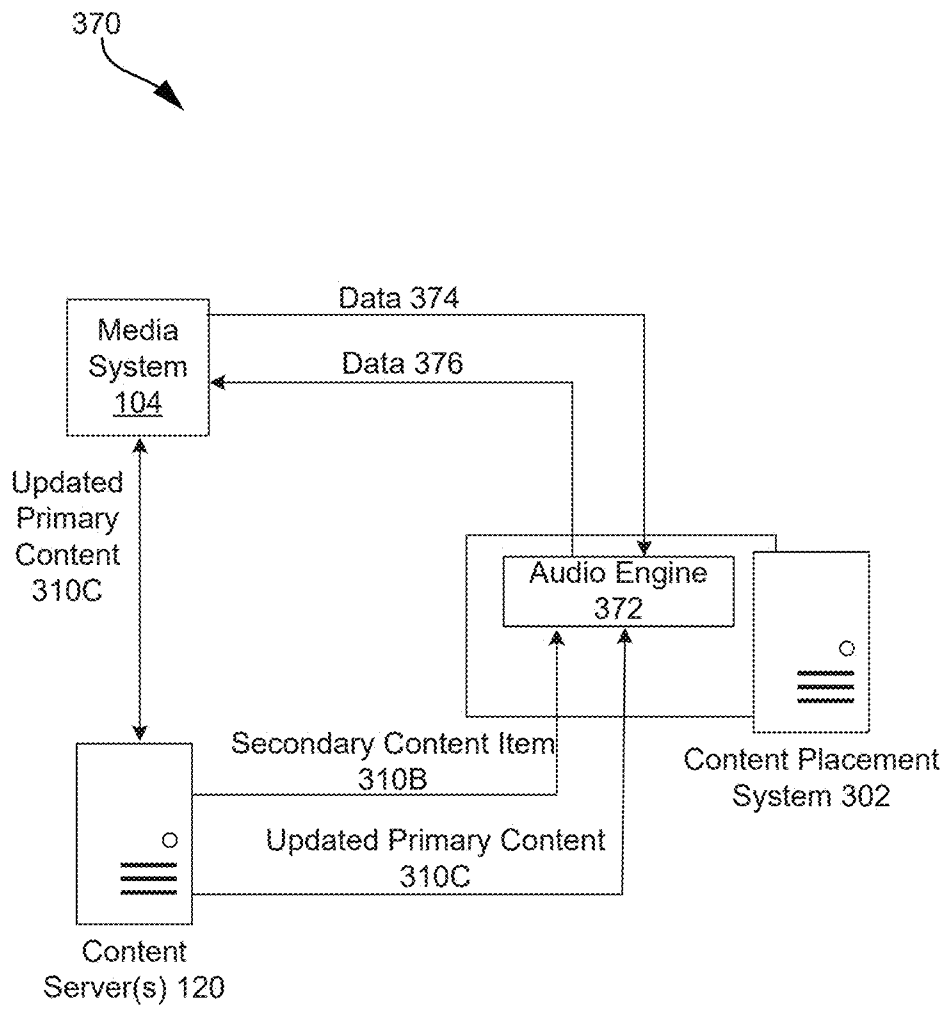
FIG. 3H illustrates an example system process for determining whether to output the audio or audio-related text data of a secondary content item.

Method 700 shall be described with reference to FIG. 3H. However, method 700 is not limited to that example. At step 702, content placement system 302 may obtain data about audio associated with a primary content item, the secondary content, and/or audio related text associated with the audio of the secondary content item. For example, audio engine 372 may obtain, from media system 104, such as media device 106 and/or display device 108 operated by the user, data 374 indicating whether the audio and/or audio-related text data of the displayed primary content item (e.g., primary content 310A) is being or will be outputted by media device 106 and/or display device 108 (if any). In some instances, the data about the audio of the primary content item may include data 374. Additionally, or alternatively, the data about the audio may include noise levels, type of audio (e.g., speech, weather, music noise, etc.), the information conveyed by such audio (if any), etc. Moreover, audio engine 372 may obtain, from media system 104, data about the audio (if any) of the secondary content item (e.g., secondary content 310B) and/or audio-related text of the audio of the secondary content item (if any).

At step 704, content placement system 302 may determine whether to output audio data and/or audio-related text data of the secondary content item, while the primary content item is being displayed. For example, audio engine 372 may determine a relevance of the audio of the primary content item (e.g., primary content 310A) based on the data about the audio of the primary content item, such as with respect to the plot, an event depicted, an activity depicted, other frames of the primary content item, a message conveyed, etc.). Moreover, audio engine 372 may determine whether the relevance of the audio is equal to or greater than a threshold relevance (e.g., whether a value corresponding to the relevance is greater than or equal to the value corresponding to the threshold relevance). In instances where the relevance of the audio is equal to or greater than a threshold relevance, audio engine 372 may determine to output the audio-related text of the audio of the secondary content item (e.g., secondary content 310B). Alternatively, if audio engine 372 determines the relevance of the audio is less than a threshold relevance (e.g., a value corresponding to the relevance is less than the value corresponding to the threshold relevance), audio engine 372 determine to output the audio of the secondary content item.

At step 706, content placement system 302 may cause the output of the audio data and/or audio-related text data of the secondary content item based on determining whether to output audio and/or audio-related text data of the secondary content item. For instance, audio engine 372 may determine to output audio-related text data of the secondary content item. In such an instance, audio engine 372 may communicate with or provide an instruction, such as data 376, to a computing device (e.g., media device 106 and/or display device 108) to output the audio-related text of the secondary content item. In another instance, audio engine 372 may determine to output audio data of the secondary content item. In such an instance, audio engine 372 may communicate with or provide an instruction, such as data 376, to a computing device (e.g., media device 106 and/or display device 108) to output the audio of the secondary content item.

In some examples, audio engine 372 may determine an interest level of a user relative to a secondary content item. In such examples, audio engine 372 may receive data, such as account data of the user, interaction data 404 between the user and secondary content item(s), etc. Moreover, based on such data, audio engine 372 may determine an interest level to the secondary content item or attributes associated with the secondary content item (e.g., topic, theme, product associated, etc.) and a corresponding interest level value. Based on the interest value and/or corresponding interest level value, audio engine 372 may determine whether to mute the audio of the primary content item or output audio-related text data of the audio of the primary content item. For instance, audio engine 372 may determine whether the interest level of the secondary content item is greater than or equal to a threshold interest level (e.g., whether a value corresponding to the interest level is greater than or equal to the value corresponding to the threshold interest level). In instances where the interest level of the audio is equal to or greater than a threshold interest level, audio engine 372 may determine to mute or output audio-related text of the audio of the primary content item. Moreover, audio engine 372 may communicate with a computing device, such as media device 106 and/or display device 108, to mute the audio of the primary content item and/or output audio-related text of the audio of the primary content item.

Example Neural Network Architectures

Figure 8:
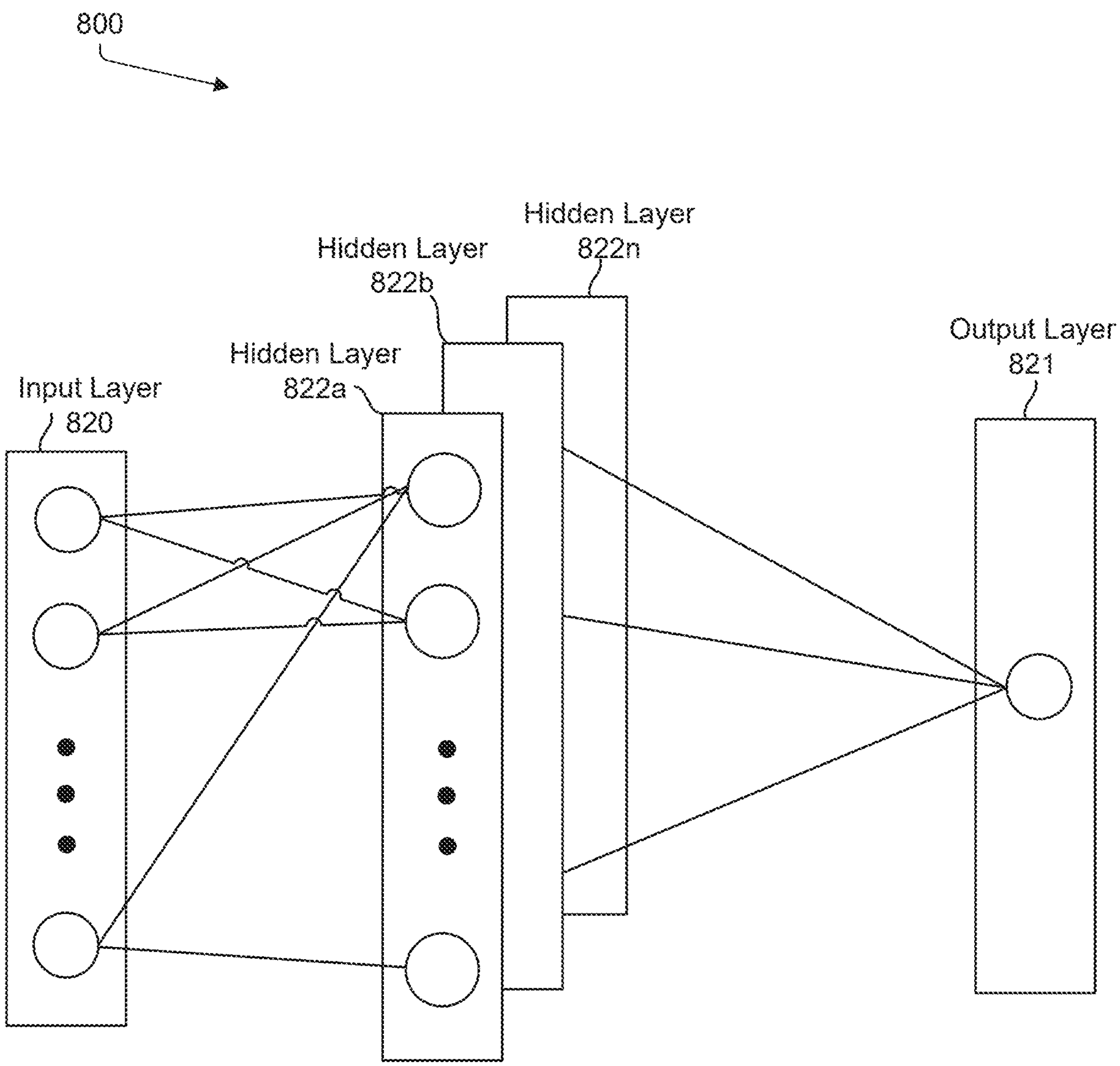
FIG. 8 is a diagram illustrating an example of a neural network architecture, according to some examples of the present disclosure.

FIG. 8 is a diagram illustrating an example of a neural network architecture 800 that can be used to implement some or all of the neural networks described herein. The neural network architecture 800 can include an input layer 820 that can be configured to receive and process data to generate one or more outputs. The neural network architecture 800 also includes hidden layers 822*a*, 822*b*, through 822*n*. The hidden layers 822*a*, 822*b*, through 822*n* include "n" number of hidden layers, where "n" is an integer greater than or equal to one. The number of hidden layers can be made to include as many layers as needed for the given application. The neural network architecture 800 further includes an output layer 821 that provides an output resulting from the processing performed by the hidden layers 822*a*, 822*b*, through 822*n*.

The neural network architecture 800 is a multi-layer neural network of interconnected nodes. Each node can represent a piece of information. Information associated with the nodes is shared among the different layers and each layer retains information as information is processed. In some cases, the neural network architecture 800 can include a feed-forward network, in which case there are no feedback connections where outputs of the network are fed back into itself. In some cases, the neural network architecture 800 can include a recurrent neural network, which can have loops that allow information to be carried across nodes while reading in input.

Information can be exchanged between nodes through node-to-node interconnections between the various layers. Nodes of the input layer 820 can activate a set of nodes in the first hidden layer 822*a*. For example, as shown, each of the input nodes of the input layer 820 is connected to each of the nodes of the first hidden layer 822*a*. The nodes of the first hidden layer 822*a* can transform the information of each input node by applying activation functions to the input node information. The information derived from the transformation can then be passed to and can activate the nodes of the next hidden layer 822*b*, which can perform their own designated functions. Example functions include convolutional, up-sampling, data transformation, and/or any other suitable functions. The output of the hidden layer 822*b* can then activate nodes of the next hidden layer, and so on. The output of the last hidden layer 822*n* can activate one or more nodes of the output layer 821, at which an output is provided. In some cases, while nodes in the neural network architecture 800 are shown as having multiple output lines, a node can have a single output and all lines shown as being output from a node represent the same output value.

In some cases, each node or interconnection between nodes can have a weight that is a set of parameters derived from the training of the neural network architecture 800. Once the neural network architecture 800 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 800 to be adaptive to inputs and able to learn as more and more data is processed.

The neural network architecture 800 is pre-trained to process the features from the data in the input layer 820 using the different hidden layers 822*a*, 822*b*, through 822*n* in order to provide the output through the output layer 821.

In some cases, the neural network architecture 800 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 800 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as E_total=Σ(½ (target-output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network architecture 800 can perform a backward pass by determining which inputs (weights) most contributed to the loss of the network and can adjust the weights so that the loss decreases and is eventually minimized.

The neural network architecture 800 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 800 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 9:
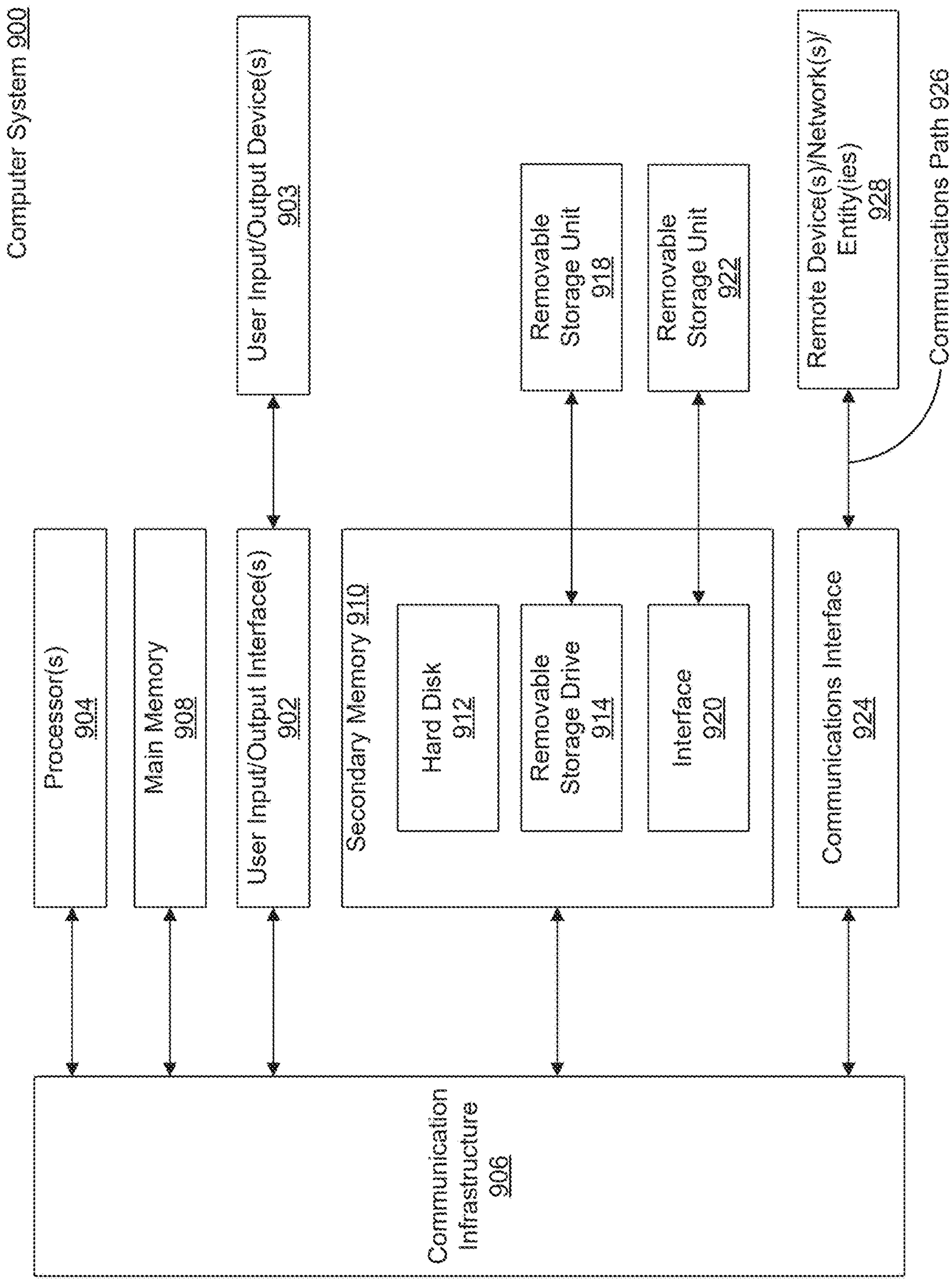
FIG. 9 illustrates an example computer system that can be used for implementing various aspects of the present disclosure.

Various aspects and examples may be implemented, for example, using one or more well-known computer systems, such as computer system 900 shown in FIG. 9. For example, the media device 106 may be implemented using combinations or sub-combinations of computer system 900. Also, or alternatively, one or more computer systems 900 may be used, for example, to implement any of the aspects and examples discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 900 may include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900 or processor(s) 904), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A computer-implemented method comprising: obtaining a first content item for display at a first display device, the first content item comprising video data; based on the video data, generating a saliency map of the first content item, the saliency map identifying a plurality of regions of the first content item, each region of the plurality of regions being associated with a saliency value; determining, based on the saliency map, whether one or more regions of the plurality of regions have a saliency value that is below a predetermined saliency value; and based on the determining whether the one or more regions have a saliency value that is below a predetermined saliency value, determining whether to insert a second content item within the one or more regions of the first content item or within a display region of a second display device.

Aspect 2. The computer-implemented method of Aspect 1, further comprising: obtaining device data of a computing device associated with a user; based on the device data, determining that the computing device is connected to multiple display devices, the multiple display devices comprising the first display device and the second display device; determining that the first display device of the multiple display devices is displaying the first content item; and based on a determination that the one or more regions of the plurality of regions do not have a saliency value that is below the predetermined saliency value, determining to display the second content item on the second display device of the multiple display devices.

Aspect 3. The computer-implemented method of any of Aspects 1 to 2, further comprising: obtaining data about one or more user interactions with at least one of the first content item and the second content item; and determining whether to insert the second content item within the one or more regions of the first content item or within the display region of a second display device further based on the data about the one or more user interactions.

Aspect 4. The computer-implemented method of any of Aspects 1 to 3, further comprising: obtaining data about one or more user interactions with at least one of the first content item and the second content item; and based on the data about the one or more user interactions, determining to move at least a portion of the second content item to different region of the first content item.

Aspect 5. The computer-implemented method of any of Aspects 1 to 4, further comprising: determining at least one of saliency data and attention data associated with the first content item, the attention data indicating at least one of a user attention level corresponding to the first content item and user engagement with the first content item; and based on the at least one of saliency data and attention data, determining whether to insert the second content item within the one or more regions of the first content item or within the display region of a second display device.

Aspect 6. The computer-implemented method of any of Aspects 1 to 5, further comprising: obtaining subtitle data of at least one of the first content item and the second content item; and displaying information included in the subtitle data on the second display device.

Aspect 7. The computer-implemented method of any of Aspects 1 to 6, wherein determining whether to insert the second content item within the one or more regions of the first content item or within the display region of a second display device comprises determining that the first content item is displayed via the first display device; and determining to display the second content item via the second display device based on the determining that the first content item is displayed via the first display device.

Aspect 8. A system, comprising: a memory storing instructions; and at least one processor coupled to the memory and configured to execute the instructions to: obtain a first content item for display at a first display device, the first content item comprising video data; based on the video data, generate a saliency map of the first content item, the saliency map identifying a plurality of regions of the first image, each region of the plurality of regions being associated with a saliency value; determine, based on the saliency map, whether one or more regions of the plurality of regions have a saliency value that is below a predetermined saliency value; and based on the determining whether the one or more regions have a saliency value that is below a predetermined saliency value, determine whether to insert a second content item within the one or more regions of the first content item or within a display region of a second display device.

Aspect 9. The system of Aspect 8, wherein the at least one processor is configured to execute the instructions further to: obtain device data of a computing device associated with a user; based on the device data, determine that the computing device is connected to multiple display devices, the multiple display devices comprising the first display device and the second display device; determine that the first display device of the multiple detected display devices is displaying the first content item; and based on a determination that the one or more regions of the plurality of regions do not have a saliency value that is below the predetermined saliency value, determine to display the second content item on the second display device of the multiple display devices.

Aspect 10. The system of any of Aspects 8 to 9, wherein the at least one processor is configured to execute the instructions further to: obtain data about one or more user interactions with at least one of the first content item and the second content item; and determine whether to insert the second content item within the one or more regions of the first content item or within the display region of a second display device further based on the data about the one or more user interactions.

Aspect 11. The system of any of Aspects 8 to 10, wherein the at least one processor is configured to execute the instructions further to: obtain data about one or more user interactions with at least one of the first content item and the second content item; and based on the data about the one or more user interactions, determine to move at least a portion of the second content item to different region of the first content item.

Aspect 12. The system of any of Aspects 8 to 11, wherein the at least one processor is configured to execute the instructions further to: determine at least one of saliency data and attention data associated with the first content item, the attention data indicating at least one of a user attention level corresponding to the first content item and user engagement with the first content item; and based on the at least one of saliency data and attention data, determine whether to insert the second content item within the one or more regions of the first content item or within the display region of a second display device.

Aspect 13. The system of any of Aspects 8 to 12, wherein the at least one processor is configured to execute the instructions further to: obtain subtitle data of at least one of the first content item and the second content item; and display information included in the subtitle data on the second display device.

Aspect 14. The system of any of Aspects 8 to 13, wherein determining whether to insert the second content item within the one or more regions of the first content item or within the display region of a second display device comprises determining that the first content item is displayed via the first display device; and determining to display the second content item via the second display device based on the determining that the first content item is displayed via the first display device.

Aspect 15. A non-transitory computer-readable medium having instructions stored thereon that, when executed by at least one computing device, cause the at least one computing device to perform operations comprising: obtaining a first content item for display at a first display device, the first content item comprising video data; based on the video data, generating a saliency map of the first content item, the saliency map identifying a plurality of regions of the first content item, each region of the plurality of regions being associated with a saliency value; determining, based on the saliency map, whether one or more regions of the plurality of regions have a saliency value that is below a predetermined saliency value; and based on the determining whether the one or more regions have a saliency value that is below a predetermined saliency value, determining whether to insert a second content item within the one or more regions of the first content item or within a display region of a second display device.

Aspect 16. The non-transitory computer-readable medium of Aspect 15, wherein the instructions further cause the at least one computing device to perform operations comprising: obtaining device data of a computing device associated with a user; based on the device data, determining that the computing device is connected to multiple display devices, the multiple display devices comprising the first display device and the second display device; determining that the first display device of the multiple display devices is displaying the first content item; and based on a determination that the one or more regions of the plurality of regions do not have a saliency value that is below the predetermined saliency value, determining to display the second content item on the second display device of the multiple display devices.

Aspect 17. The non-transitory computer-readable medium of any of Aspects 15 to 16, wherein the instructions further cause the at least one computing device to perform operations comprising: obtaining data about one or more user interactions with at least one of the first content item and the second content item; and determine whether to insert the second content item within the one or more regions of the first content item or within the display region of a second display device further based on the data about the one or more user interactions.

Aspect 18. The non-transitory computer-readable medium of any of Aspects 15 to 17, wherein the instructions further cause the at least one computing device to perform operations comprising: obtain data about one or more user interactions with at least one of the first content item and the second content item; and based on the data about the one or more user interactions, determine to move at least a portion of the second content item to different region of the first content item.

Aspect 19. The non-transitory computer-readable medium of any of Aspects 15 to 18, wherein the instructions further cause the at least one computing device to perform operations comprising: determine attention data associated with the first content item, the attention data indicating at least one of a user attention level corresponding to the first content item and user engagement with the first content item; and based on the attention data, determine whether to insert the second content item within the one or more regions of the first content item or within the display region of a second display device.

Aspect 20. The non-transitory computer-readable medium of any of Aspects 15 to 19, wherein determining whether to insert the second content item within the one or more regions of the first content item or within the display region of a second display device comprises determining that the first content item is displayed via the first display device; and determining to display the second content item via the second display device based on the determining that the first content item is displayed via the first display device.

Aspect 21. A system comprising means for performing a method according to any of Aspects 1 to 7.

What is claimed is:

1. A computer-implemented method comprising:

obtaining device data of a computing device associated with a user;

based on the device data, determining that a computing device is connected to multiple display devices, the multiple display devices comprising a first display device and a second display device;

obtaining a first content item for display at the first display device, the first content item comprising video data;

based on the video data, generating a saliency map of the first content item, the saliency map identifying a plurality of regions of the first content item, each region of the plurality of regions being associated with a saliency value;

determining one or more regions of the plurality of regions do not have a saliency value that is below a predetermined saliency value based on the saliency map; and based on the determining the one or more regions do not have a saliency value that is below a predetermined saliency value, determining to display a second content item within a display region of a second display device.

2. The computer-implemented method of claim 1, further comprising:

determining that the first display device of the multiple display devices is displaying the first content item.

3. The computer-implemented method of claim 1, further comprising:

obtaining data about one or more user interactions with at least one of the first content item and the second content item; and wherein determining to display the second content item within the display region of the second display device is further based on the data about the one or more user interactions.

4. The computer-implemented method of claim 1, further comprising:

obtaining data about one or more user interactions with at least one of the first content item and the second content item.

5. The computer-implemented method of claim 1, further comprising:

determining at least one of saliency data and attention data associated with the first content item, the attention data indicating at least one of a user attention level corresponding to the first content item and user engagement with the first content item; and wherein determining to display the second content item within the display region of the second display device is further based on the saliency data and the attention data.

6. The computer-implemented method of claim 1, further comprising:

obtaining subtitle data of at least one of the first content item and the second content item; and displaying information included in the subtitle data on the second display device.

7. The computer-implemented method of claim 1, wherein determining to display the second content item within the display region of the second display device comprises determining that the first content item is displayed via the first display device; and determining to display the second content item via the second display device based on the determining that the first content item is displayed via the first display device.

8. A system, comprising:

a memory storing instructions; and at least one processor coupled to the memory and configured to execute the instructions to:

obtain device data of a computing device associated with a user;

based on the device data, determine that a computing device is connected to multiple display devices, the multiple display devices comprising a first display device and a second display device;

obtain a first content item for display at the first display device, the first content item comprising video data;

based on the video data, generate a saliency map of the first content item, the saliency map identifying a plurality of regions of the first content item, each region of the plurality of regions being associated with a saliency value;

determine one or more regions of the plurality of regions do not have a saliency value that is below a predetermined saliency value based on the saliency map; and based on the determining the one or more regions do not have a saliency value that is below a predetermined saliency value, determine to display a second content item within a display region of a second display device.

9. The system of claim 8, wherein the at least one processor is configured to execute the instructions further to:

determine that the first display device of the multiple display devices is displaying the first content item.

10. The system of claim 8, wherein the at least one processor is configured to execute the instructions further to:

obtain data about one or more user interactions with at least one of the first content item and the second content item; and wherein to determine to display the second content item within the display region of the second display device is further based on the data about the one or more user interactions.

11. The system of claim 8, wherein the at least one processor is configured to execute the instructions further to:

obtain data about one or more user interactions with at least one of the first content item and the second content item.

12. The system of claim 8, wherein the at least one processor is configured to execute the instructions further to:

determine at least one of saliency data and attention data associated with the first content item, the attention data indicating at least one of a user attention level corresponding to the first content item and user engagement with the first content item; and wherein to determine to display the second content item within the display region of the second display device is further based on the saliency data and the attention data.

13. The system of claim 8, wherein the at least one processor is configured to execute the instructions further to:

obtain subtitle data of at least one of the first content item and the second content item; and display information included in the subtitle data on the second display device.

14. The system of claim 8, wherein to determine to display the second content item within the display region of the second display device comprises determining that the first content item is displayed via the first display device; and determining to display the second content item via the second display device based on the determining that the first content item is displayed via the first display device.

15. A non-transitory computer-readable medium having instructions stored thereon that, when executed by at least one computing device, cause the at least one computing device to perform operations comprising:

obtaining device data of a computing device associated with a user;

based on the device data, determining that the computing device is connected to multiple display devices, the multiple display devices comprising a first display device and a second display device;

obtaining a first content item for display at the first display device, the first content item comprising video data;

based on the video data, generating a saliency map of the first content item, the saliency map identifying a plurality of regions of the first content item, each region of the plurality of regions being associated with a saliency value;

determining one or more regions of the plurality of regions do not have a saliency value that is below a predetermined saliency value based on the saliency map; and based on the determining the one or more regions do not have a saliency value that is below a predetermined saliency value, determining to display a second content item within a display region of a second display device.

16. The non-transitory computer-readable medium of claim 15, wherein the instructions further cause the at least one computing device to perform operations comprising:

determining that the first display device of the multiple display devices is displaying the first content item.

17. The non-transitory computer-readable medium of claim 15, wherein the instructions further cause the at least one computing device to perform operations comprising:

obtaining data about one or more user interactions with at least one of the first content item and the second content item; and wherein determining to display the second content item within the display region of the second display device is further based on the data about the one or more user interactions.

18. The non-transitory computer-readable medium of claim 15, wherein the instructions further cause the at least one computing device to perform operations comprising:

obtaining data about one or more user interactions with at least one of the first content item and the second content item.

19. The non-transitory computer-readable medium of claim 15, wherein the instructions further cause the at least one computing device to perform operations comprising:

determining attention data associated with the first content item, the attention data indicating at least one of a user attention level corresponding to the first content item and user engagement with the first content item; and wherein determining display the second content item within the display region of the second display device is further based on the saliency data and the attention data.

20. The non-transitory computer-readable medium of claim 15, wherein determining to display the second content item within the display region of the second display device comprises determining that the first content item is displayed via the first display device; and determining to display the second content item via the second display device based on the determining that the first content item is displayed via the first display device.

* * * * *